United States Patent [19]

Lyon

[11] Patent Number: 5,675,665

[45] Date of Patent: Oct. 7, 1997

[54] SYSTEM AND METHOD FOR WORD RECOGNITION USING SIZE AND PLACEMENT MODELS

[75] Inventor: Richard F. Lyon, Los Altos, Calif.

[73] Assignee: Apple Computer, Inc., Cupertino, Calif.

[21] Appl. No.: 315,886

[22] Filed: Sep. 30, 1994

[51] Int. Cl.$^6$ .............................. G06K 9/72; G06K 9/34
[52] U.S. Cl. .................... 382/229; 382/177; 382/187; 382/200; 382/206
[58] Field of Search .................... 382/159, 177, 382/184, 185, 187, 195, 199, 200, 203, 229, 230

[56] References Cited

U.S. PATENT DOCUMENTS

| | | | |
|---|---|---|---|
| 4,610,025 | 9/1986 | Blum et al. | 382/177 |
| 4,727,588 | 2/1988 | Fox et al. | 382/177 |
| 4,850,025 | 7/1989 | Abe | 382/177 |
| 4,972,496 | 11/1990 | Sklarew | 382/187 |
| 5,052,043 | 9/1991 | Gaborski | 382/157 |
| 5,210,704 | 5/1993 | Husseiny | 364/551.01 |
| 5,239,592 | 8/1993 | Kameyama et al. | 382/177 |
| 5,261,009 | 11/1993 | Bokser | 382/230 |
| 5,434,929 | 7/1995 | Beernik et al. | 382/187 |
| 5,517,578 | 5/1996 | Altman et al. | 382/200 |
| 5,528,743 | 6/1996 | Tou et al. | 382/181 |

OTHER PUBLICATIONS

Parizeau and Plamondon, Allograph Adjacency Constraints for Cursive Script Recognition, Pre-Proceedings IWFHR III, 1993, 252-61.

Primary Examiner—Leo Boudreau
Assistant Examiner—Bipin Shalwala
Attorney, Agent, or Firm—Carr, DeFilippo & Ferrell

[57] ABSTRACT

A bounds evaluation unit generates a bounds measurement pair corresponding to a character pattern pair determined from a handwritten word. Within the bounds measurement pair, a first bounds measurement corresponds to a first character pattern, and a second bounds measurement corresponds to a second character pattern. The first and second bounds measurements are each a bounding box that defines a left-most, a right-most, a top-most, and a bottom-most extent of the corresponding character pattern. The bounds measurement pair is compared against one or more bounds model pairs, where each bounds model pair corresponds to a hypothesized character identifier pair in which each individual hypothesized character identifier has been determined by a character recognition unit. Each bounds model pair indicates the expected size and position of a character pattern pair corresponding to the hypothesized character identifier pair. Bounds model pairs are trained based upon size and positional relationships between character pattern pairs within handwritten training words. The comparison of the bounds measurement pair against a given bounds model pair produces a set of error values. The error values are used in conjunction with an error covariance matrix that has also been trained with handwritten training words to determine a pairwise cost value associated with the hypothesized character identifier pair. A word recognition unit incorporates individual character cost values and each pairwise cost value in a conventional minimum-cost path search method to determine the identity of the handwritten word.

14 Claims, 17 Drawing Sheets

$\sum(E1*E1) \quad \sum(E1*E2) \quad \sum(E1*E3) \quad \cdots \quad \sum(E1*E8)$ $\sum(E2*E1) \quad \sum(E2*E2) \quad \sum(E2*E3) \quad \cdots \quad \sum(E2*E8)$

.
.
.

$\sum(E8*E1) \quad \sum(E8*E2) \quad \sum(E8*E3) \quad \cdots \quad \sum(E8*E8)$

↗
160

Var. (E1, E1)   Cov. (E1, E2)   Cov. (E1, E3)   · · ·   Cov. (E1, E8)

Cov. (E2, E1)   Var. (E2, E2)   Cov. (E2, E3)   · · ·   Cov. (E2, E8)

·
·
·

Cov. (E8, E1)   Cov. (E8, E2)   Cov. (E8, E3)   · · ·   Var. (E8, E8)

180

Graphical representation of an exemplary set of Chineese ideographs

SYSTEM AND METHOD FOR WORD RECOGNITION USING SIZE AND PLACEMENT MODELS

BACKGROUND OF THE INVENTION

1. Field of the Invention

The present invention relates generally to systems and methods for word recognition, and more particularly to systems and methods that utilize size and positional relationships between characters to perform handwriting recognition.

2. Description of the Background Art

Within essentially any alphabet, different characters often exhibit similar shapes. For example, the shape of an upper-case "O" is nearly identical to that of a lower-case "o" and that of the number "0". As another example, an upper-case "S," a lower-case "s," and the number "5" each have very similar shapes. When handwritten characters are grouped together in a character sequence, character shape similarities make unambiguous character sequence identification difficult. For example, an s-shaped character followed by an o-shaped character might correspond to any one of the following character sequences: "SO," "5O," "sO," "So," "5o," "so," "S0," "50," or "s0." Correctly determining which character sequence is intended requires contextual information such as relative character size and position information.

Prior art approaches for applying relative character size and position information to handwriting recognition first estimate a "baseline" for each handwritten word. The baseline is an average line upon which the bottom of each upper-case letter and the body of each lower-case character in the word rests, neglecting any character ascenders, descenders, or diacritical marks. Once the baseline has been estimated, individual character sizes within the word can be compared relative to the baseline, thereby aiding word recognition. Accurate baseline estimation, however, depends upon a successful identification of each character within a word, such that the baseline estimation is not influenced by character ascenders, descenders, or diacritical marks. Unfortunately, successful identification of each character within the word requires an accurate baseline determination. Thus, the prior art approach suffers from an inherent circular dependency that significantly limits its accuracy and usefulness.

What is needed is a means for applying relative character size and position information to handwriting recognition that does not suffer from the shortcomings of the prior art.

SUMMARY OF THE INVENTION

The present invention is a system and method for handwriting recognition using size and placement models. The system comprises a processing unit, a handwriting input device, a word recognition unit, a character recognition unit, and a bounds evaluation unit. The word recognition unit creates a word structure corresponding to each handwritten word within a sequence of handwritten words input via the handwriting input device. For each word structure, the word recognition unit creates a set of character structures, where each character structure stores a character pattern representing a given character within a handwritten word.

The character recognition unit performs character recognition operations to generate one or more hypothesized character identifiers and one or more corresponding character cost values for each character pattern associated with a given word structure. Each hypothesized character identifier indicates a possible identity for a character pattern, and the corresponding character cost value indicates how likely the hypothesized character identifier is to be the correct character identifier. The bounds evaluation unit sequentially selects pairs of character structures associated with each word structure. For a first and second character structure forming a character structure pair, the bounds evaluation unit respectively generates a first bounds measurement corresponding to a first character pattern and a second bounds measurement corresponding to a second character pattern. Each bounds measurement is preferably a bounding box that defines a left-most, a right-most, a top-most, and a bottom-most extent, or boundary, of the corresponding character pattern in coordinate values. Taken together, the first and second bounds measurements form a bounds measurement pair.

The bounds evaluation unit considers each hypothesized character identifier associated with the first character pattern and each hypothesized character identifier associated with the second character pattern in a pairwise manner. For each such pair of hypothesized character identifiers, the bounds evaluation unit generates a bounds model pair that indicates the expected size and position of a character pattern pair corresponding to the currently-considered hypothesized character identifier pair. The bounds evaluation unit trains bounds model pairs based upon actual size and positional relationships between character pattern pairs within handwritten training words.

The bounds evaluation unit scales the bounds measurement pair relative to the currently-considered bounds model pair, and generates a set of error values that indicates how closely the bounds measurement pair matches the currently-considered bounds model pair. The bounds evaluation unit additionally generates a pairwise cost value from the set of error values and an error covariance matrix that defines a multivariate Gaussian probability distribution for the error values, where the error covariance matrix has been trained from handwritten training words. The pairwise cost value is proportional to the negative log of the multivariate Gaussian distribution's likelihood value, and indicates how likely the currently-considered hypothesized character identifier pair is to be the correct character identifier pair. Because the bounds evaluation unit considers each pair of hypothesized character identifiers associated with the first character pattern and the second character pattern, a pairwise cost value is generated for each such pair of hypothesized character identifiers.

The word recognition unit uses each character cost value and each pairwise cost value in a conventional minimum-cost path search method to determine an identity for each handwritten word. Unlike the prior art, the present invention does not require the estimation of a baseline to arrive at a recognition result. Therefore, the present invention can accurately and simultaneously incorporate both the character cost values and the pairwise cost values into the minimum-cost path search method to arrive at a recognition result. The present invention thus provides greater recognition accuracy than prior art handwriting recognition systems and methods that estimate a baseline.

The present invention is applicable to Western-language writing systems based upon words that possibly include diacritical marks, and to Asian-language writing systems based upon ideographs that comprise one or more radicals or other subcharacter units.

DETAILED DESCRIPTION OF THE PREFERRED EMBODIMENTS

Figure 1:
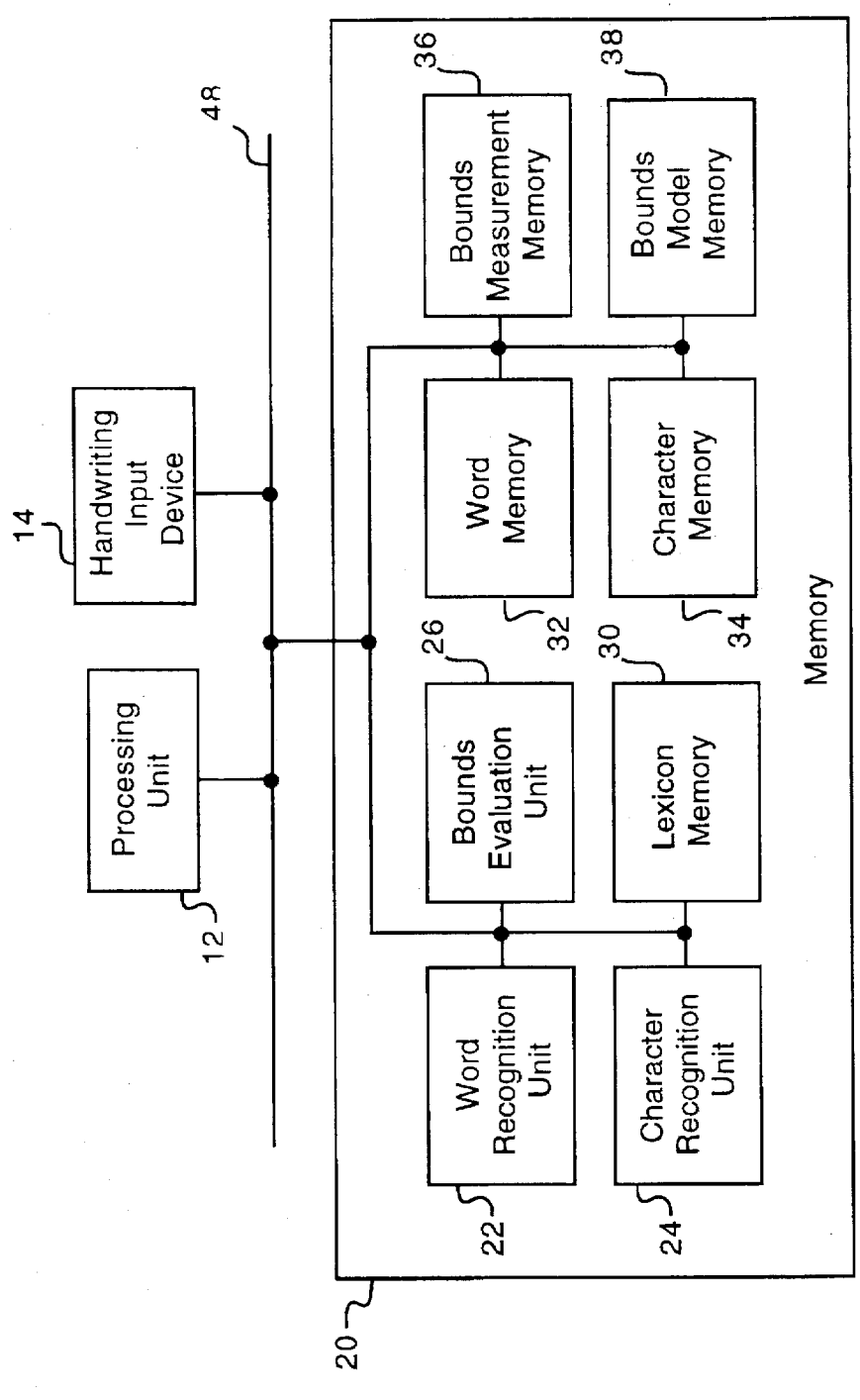
FIG. 1 is a block diagram of a preferred embodiment of a system for handwriting recognition using size and placement models.

Referring now to FIG. 1, a block diagram of a preferred embodiment of a system 10 for handwriting recognition using size and placement models constructed in accordance with the present invention is shown. The system 10 comprises a processing unit 12, a handwriting input device 14, and a predetermined amount of memory 20 storing a word recognition unit 22, a character recognition unit 24, a bounds evaluation unit 26, a lexicon memory 30, a word memory 32, a character memory 34, a bounds measurement memory 36, and a bounds model memory 38. Each element of the system 10 has an input and an output coupled to a common system bus 48.

In an exemplary embodiment, the system 10 is an Apple Newton Personal Digital Assistant (PDA) having an ARM 610 microprocessor and a memory 20 having 4 Megabytes of Read-Only Memory (ROM) plus 1 megabyte of Random Access Memory (RAM) wherein the word recognition unit 22, the character recognition unit 24, the bounds evaluation unit 26, the lexicon memory 30, the word memory 32, the character memory 34, the bounds measurement memory 36, and the bounds model memory 38 reside.

The handwriting input device 14 is preferably a conventional pen-and-tablet device that translates pen motions generated by a user into a sequence of pen signals. Each pen signal corresponds to a coordinate pair indicating the detected position of the pen. In the preferred embodiment, each pen signal specifies a coordinate pair. The handwriting input device 14 stores each pen signal sequentially in the word memory 32, beginning at a predetermined location. In the preferred embodiment, the handwriting input device 14 also functions as a display device for system-generated messages that provide the user with instructions or other information. Via the handwriting input device 14, a user provides the system 10 with commands, and handwritten input upon which handwriting recognition operations are performed. Preferably, the handwritten input comprises either 1) one or more words, where each word contains one or more characters written according to a character positioning rule; or 2) one or more ideographs written according to an Asian language, where each ideograph comprises a set of radicals or other subcharacter units. Herein, the case in which the handwritten input comprises one or more words written according to a left-to-right character positioning rule will be considered first.

Those skilled in the art will recognize that in an alternate embodiment, the present invention could function with an optical input means rather than the handwriting input device 14 to provide optical character recognition capabilities. While the description that follows is described in terms of handwritten word recognition, those skilled in the art will recognize that the present invention is equally applicable to word recognition in general.

In handwriting recognition systems, it is conventional to utilize contextual models to bias a recognition result towards character sequences that are a priori more likely. In the most general case, context models might include knowledge of the structure of phone numbers, social security numbers, equations, names, or punctuation rules, in addition to a large lexicon, or dictionary, of known legal words. In the simplest case, it is conventional to constrain the handwriting recognition system to recognize only those words, or character sequences, that correspond to entries in a lexicon. For ease of understanding, the present invention is described according to this constraint; that is, a handwriting recognition result corresponds to an entry within a lexicon. Those skilled in the art will recognize that the use of contextual models as described above in no way affects the applicability of the present invention.

The lexicon memory 30 stores a set of words comprising a lexicon. Each word in the lexicon preferably comprises a word identifier and a series of character identifiers, where each character identifier corresponds to a character within an alphabet.

The word recognition unit 22 prompts the handwriting input device 14 to accept handwritten input, the character recognition unit 24 to perform character recognition operations, and the bounds evaluation unit 26 to perform bounds measurement pair recognition operations as will be described in detail below. In addition, the word recognition unit 22 uses results generated by the character recognition unit 24 and the bounds evaluation unit 26 to identify each handwritten word as a particular word within the lexicon. The detailed operations performed by each of the word recognition unit 22, the character recognition unit 24, and the bounds evaluation unit 26 are hereafter described.

Figure 2:
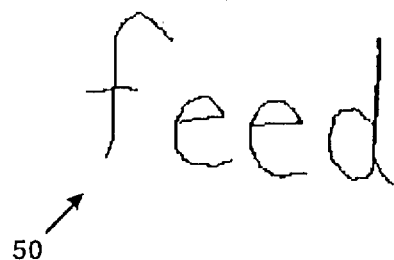
FIG. 2 is a graphical representation of an exemplary handwritten training word upon which training operations are performed.
Figure 3:
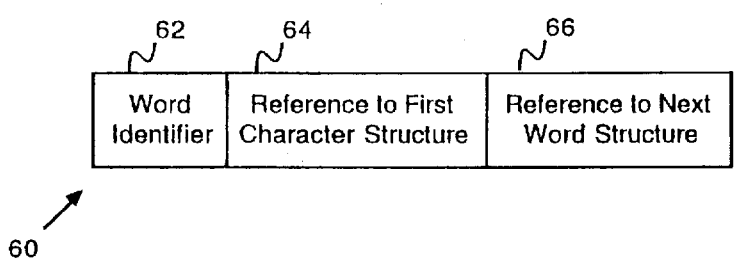
FIG. 3 is a block diagram of a preferred embodiment of a word structure of the present invention.

The system 10 of the present invention requires training to facilitate accurate recognition of handwritten words. The word recognition unit 22 performs training operations in response to an initiate training signal generated by the handwriting input device 14, as will now be described. Preferably, the initiate training signal indicates that a user has completed the entry of one or more handwritten words upon which training operations are to be performed. After receiving the initiate training signal, the word recognition unit 22 analyzes the sequence of pen signals generated by the handwriting input device 14, and determines the starting and ending points within the sequence of pen signals for a first handwritten training word. The determination of the starting and ending points for the first handwritten training word from the sequence of pen signals generated by the handwriting input device 14 is performed in a conventional manner, such as by use of time-out and/or gap threshold signals. Referring now to FIG. 2, a graphical representation of an exemplary handwritten training word 50 is shown. The exemplary handwritten training word 50 is the word "feed." After identifying the starting and ending points for the first handwritten training word, the word recognition unit 22 creates a corresponding word structure 60. Referring now to FIG. 3, a block diagram of a preferred embodiment of a word structure 60 is shown. The word structure 60 is a data structure having a first data field 62 for storing a word identifier; a second data field 64 for storing a reference to a first character structure 70, which is described in detail below with reference to FIG. 4; and a third data field 66 for storing a reference to a next word structure 60.

After creating the word structure 60 corresponding to the first handwritten training word, the word recognition unit 22 prompts the user to identify the first handwritten training word as a particular entry within the lexicon. In response to an identification signal received from the handwriting input device 14 that specifies a word identifier, the word recognition unit 22 stores the word identifier for the specified lexicon entry in the word structure's first data field 62, thereby associating the word structure 60 with a known word. The word recognition unit 22 then stores the word structure 60 in the word memory 32.

The word recognition unit 22 next partitions the sequence of coordinate pairs forming the handwritten training word to create a sequence of character patterns. Each character pattern corresponds to a particular handwritten character within the corresponding handwritten training word, and therefore each character pattern is also a sequence of coordinate pairs. The word recognition unit performs the above partitioning according to a conventional segmentation method, such as by detecting gap and overlap thresholds. For the exemplary handwritten training word 50 of FIG. 2, the word recognition unit 22 would create four character patterns, namely, a character pattern for each of the handwritten letters "f," "e," "e," and "d."

Many handwriting recognition systems perform more than one coordinate pair sequence partitioning, or segmentation, for a given handwritten word under consideration, thereby producing multiple distinct character pattern sequences. An example of such a handwriting recognition system is described in U.S. Pat. No. 4,731,857, entitled "Recognition System for Run-On Handwritten Characters." Only one of the possible segmentations is correct; therefore, during the training operations in such a system the word recognition unit 22 would prompt the user to indicate the correct segmentation before proceeding. It is also conventional to utilize a definite front-end partitioning process, such that a search for a most likely character pattern sequence does not require the additional complexity of searching over multiple segmentation alternatives. For ease of understanding, the present invention is described herein as generating a single character pattern sequence for the handwritten word currently under consideration, for both training and handwriting recognition operations. Those skilled in the art will readily recognize that the consideration of a single segmentation in no way limits the scope or applicability of the present invention relative to the consideration of multiple segmentation alternatives.

Figure 4:
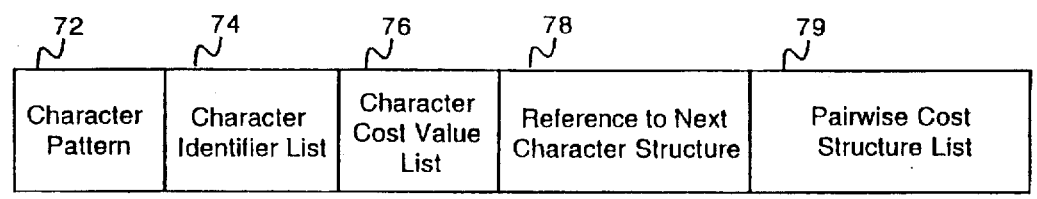
FIG. 4 is a block diagram of a preferred embodiment of a character structure of the present invention.

For each character pattern created, the word recognition unit 22 creates a corresponding character structure 70. Referring now to FIG. 4, a block diagram of a preferred embodiment of a character structure 70 is shown. The character structure 70 is a data structure that includes a first data field 72 for storing a character pattern, a second data field 74 for storing a character identifier list, a third data field 76 for storing a character cost value list, a fourth data field 78 for storing a reference to a next character structure 70, and a fifth data field 79 for storing a pairwise cost structure list. Preferably, the word recognition unit 22 creates each character structure 70 sequentially according to the order in which each character pattern had been created. For a given character structure 70, the word recognition unit 22 uses the word identifier stored in the first data field 62 of the selected word structure 60 to retrieve a corresponding character identifier from the lexicon memory 30 according to the sequential ordering of the character pattern currently under consideration. The word recognition unit 22 stores the character identifier as the sole entry in the character structure's second data field 74; this character identifier associates the character structure 70 with a known character within a known word. The word recognition unit 22 preferably stores each character structure 70 in the character memory 34. After a particular character structure 70 has been created and stored, the word recognition unit 22 stores a reference to the particular character structure 70 in the fourth data field 78 of the previously-created character structure 70 associated with the word structure 60 currently under consideration. If no previously-created character structure 70 associated with the currently-considered word structure 60 exists, the word recognition unit 22 instead stores a reference to the first character structure 70 created in the selected word structure's second data field 64.

The word recognition unit 22 next analyzes the sequence of pen signals generated by the handwriting input device 14 to determine the starting and ending points for a next handwritten training word. The word recognition unit 22 then creates and stores a word structure 60 corresponding to the next handwritten training word in the same manner as was done for the first handwritten training word, and creates and stores a corresponding set of character structures 70 in the manner described above. The word recognition unit 22 additionally stores a reference to the next handwritten training word's word structure 60 in the third data field 66 of the word structure 60 associated with the previously-considered handwritten training word. The word recognition unit 22 performs the above operations until each handwritten training word has been considered.

After each word structure 60 and corresponding set of character structures 70 associated with each handwritten training word has been created and stored, the word recognition unit 22 issues a character training signal to the character recognition unit 24. As will be described in detail below, the character recognition unit 24 performs character training operations to facilitate subsequent accurate recognition of individual character patterns.

In response to a character training completion signal, the word recognition unit 22 issues a bounds model training signal to the bounds evaluation unit 26. As will be described in detail below, the bounds evaluation unit 26 generates pairs of bounds measurements corresponding to pairs of character structures 60, where each bounds measurement is a geometric description of a character pattern; and performs bounds model training operations to facilitate subsequent recognition of bounds measurement pairs 94 generated from handwritten input. After receiving a bounds model training completion signal from the bounds evaluation unit 26, the training operations are complete and the word recognition unit 22 performs handwriting recognition operations as will now be described.

During the handwriting recognition operations, the word recognition unit 22 monitors for a recognize input signal issued by the handwriting input device 14. In the preferred embodiment, the recognize input signal indicates that a user has input one or more unknown handwritten words upon which handwriting recognition operations are to be performed. In response to the recognize input signal, the word recognition unit 22 analyzes the sequence of pen signals generated by the handwriting input device 14, and determines the starting and ending points for a first unknown handwritten word. The determination of the starting and ending points of the first unknown handwritten word from the sequence of pen signals is preferably performed in the same manner as was done during the training operations. Upon determining the starting and ending points for a first unknown handwritten word, the word recognition unit 22 creates a corresponding word structure 60, and creates a corresponding set of character structures 70 in the manner described above, except that the word identifier within the word structure 60 and the character identifier list within each character structure 70 are each left empty. The word recognition unit 22 then analyzes the sequence of pen signals generated by the handwriting input device 14 to determine the starting and ending points for a next unknown handwritten word, and creates a word structure 60 and a corresponding set of character structures 70. The word recognition unit 22 additionally stores a reference to the word structure 60 corresponding to the next unknown handwritten word in the third data field 66 of the word structure 60 associated with the first unknown handwritten word. The word recognition unit 22 repeats the above operations for each unknown handwritten word within the sequence of pen signals.

The word recognition unit 22 next issues a character recognition signal to the character recognition unit 24. In response to the character recognition signal, the character recognition unit 24 performs character recognition operations as will be described in detail below. During the character recognition operations, the character recognition unit 24 sequentially stores one or more hypothesized character identifiers in each character structure's character identifier list, and one or more corresponding character cost values in the character structure's character cost value list, as will be described in detail below.

In response to a character recognition completion signal, the word recognition unit 22 issues a bounds measurement recognition signal to the bounds evaluation unit 26. As will be described in detail below, the bounds evaluation unit 26 generates for each sequential pair of character structures 70 associated with a given word structure 60 a pairwise cost value for each pairwise combination of hypothesized character identities.

In response to a bounds measurement completion signal issued by the bounds evaluation unit 26, the word recognition unit 22 determines a most-likely sequence of hypothesized character identifiers for each word structure 60. In the preferred embodiment, the determination of a most-likely hypothesized character identifier sequence is performed according to a conventional minimum-cost path search method. In the minimum-cost path search method, character cost values corresponding to individual hypothesized character identifiers and pairwise cost values corresponding to hypothesized character identifier pairs are added along paths that correspond to hypothesized character identifier sequences. The cost values considered herein are proportional to the negative logarithm of a probabilistic likelihood value, in a conventional manner. Those skilled in the art will recognize that the present invention could readily use other types of character cost values and/or pairwise cost values. Herein, only hypothesized character identifier sequences corresponding to words in the lexicon are allowed paths for the minimum-cost path search. Upon determining a most-likely hypothesized character identifier sequence, the word recognition unit 22 searches the lexicon for a corresponding word identifier, and stores this word identifier in the word structure's first data field 62. If no minimum-cost path exists, for example because no combination of hypothesized character identifiers corresponds to a word in the lexicon, then a null identifier is stored instead to indicate that the written input could not be recognized as a known word. Once a word identifier or null value has been stored in each word structure 60, each unknown handwritten word within the user's handwritten input has been assigned an identity and the handwriting recognition operations are complete. The word recognition unit 22 subsequently monitors for the recognize input signal or the training command to determine whether additional handwriting recognition operations or training operations are to be performed, respectively. In the preferred embodiment, the word recognition unit 22 is implemented as a sequence of computer program steps stored in the memory 20 and executable by the processing unit 12. Those skilled in the art will recognize that in an alternate embodiment, the word recognition unit 22 could be implemented as dedicated hardware.

The character recognition unit 24 is a conventional pattern recognizer such as a neural network or a hidden Markov model capable of generating a set of hypothesized identities and a corresponding set of likelihood values for a character pattern received as input. In the preferred embodiment, the character recognition unit 24 is a neural network implemented as a sequence of computer program steps stored in the memory 20 and executable by the processing unit 12. Those skilled in the art will recognize that in an alternate embodiment, the character recognition unit 24 could be implemented as dedicated hardware.

In response to the character training signal issued by the word recognition unit 22, the character recognition unit 24 selects a first word structure 60. The character recognition unit 22 retrieves the contents of the selected word structure's third data field 66, and selects a first character structure 70. After selecting the first character structure 70, the character recognition unit 24 retrieves the character pattern and the character identifier stored in the selected character structure's first and second data fields 72, 74, respectively, and performs conventional pattern training operations in a manner appropriate to the character recognition unit 24, as will readily be apparent to those skilled in the art. The pattern recognition training operations facilitate the association of common features within a set of related character patterns with a known character identifier. Upon completion of the pattern training operations for the first character structure 70, the character recognition unit 22 retrieves the contents of the first character structure's fourth data field 78 and thereby selects a next character structure 70. The character recognition unit 22 performs the pattern training operations in the manner described above for each character structure 70 associated with each word structure 60. Upon completion of the pattern training operations, the character recognition unit 24 issues the character training completion signal. It will be apparent to those skilled in the art that more elaborate character training operations may be advantageous in some cases. For example, when the character recognition unit 24 is a neural network, it is conventional to train upon a set of training character patterns repeatedly, varying character pattern input order and possibly other parameters.

In response to the character recognition signal issued by the word recognition unit 22, the character recognition unit 24 selects a first word structure 60 stored in the word memory. The character recognition unit 24 then retrieves the reference to the first character structure 70 stored in the selected word structure's third data field 66, thereby selecting a first character structure 70. Next, the character recognition unit 24 retrieves the character pattern stored in the selected character structure's first data field 72, and performs conventional pattern recognition operations using this character pattern in a manner that will be readily apparent to those skilled in the art.

In the pattern recognition operations, the character recognition unit 22 generates a set of hypothesized character identifiers and a corresponding set of character cost values. Each hypothesized character identifier corresponds to a possible identity for the character pattern. Each corresponding character cost value indicates how likely the associated hypothesized character identifier is to be the correct character identifier, based upon how closely the corresponding character pattern matches a given set of training character patterns used to train the character recognition unit 24 compared to character patterns for other character identifiers.

The character recognition unit 24 sequentially stores each hypothesized character identifier and corresponding character cost value in the selected character structure's character identifier list and character cost value list, respectively. In the preferred embodiment, the character recognition unit 24 sequentially performs the operations described above for each character structure 70 associated with each word structure 60 that was created in response to the recognize input signal. After each character structure 70 associated with each word structure 60 has been considered in the manner described above, the character recognition unit 24 issues the character recognition completion signal.

The bounds evaluation unit 26 generates one or more bounds measurement pairs 94 from each sequential pair of character structures 70 created, and performs bounds model training and bounds measurement recognition operations as will now be described. In the preferred embodiment, the bounds evaluation unit 26 is a sequence of computer program steps stored in the memory 20 and executable by the processing unit 12. Those skilled in the art will recognize that in an alternate embodiment, the bounds evaluation unit 26 could be implemented as dedicated hardware.

In response to the bounds model training signal, the bounds evaluation unit 26 initiates bounds model training operations by selecting a first word structure 60 within the word memory 32. Preferably, the first word structure 60 corresponds to the handwritten training word that was written first. The bounds evaluation unit 26 next retrieves the reference to the first character structure 70 stored in the selected word structure's third data field 66, thereby selecting a first character structure 70. The bounds evaluation unit 26 then determines whether the first character structure's fourth data field 78 contains a valid reference to a second character structure 70, or a null value. That is, the bounds evaluation unit 26 determines whether the handwritten training word associated with the word structure 60 currently under consideration contained at least two characters. If the fourth data field 78 contains a null value, indicating that the handwritten training word contained only one character, the bounds evaluation unit 26 selects a next word structure 60 by retrieving the contents of the first word structure's third data field 66. The bounds evaluation unit 26 performs the above operations until a first character structure 70 that references a second character structure 70 has been found, or until each word structure 60 has been considered.

In the event that the first character structure's fourth data field 78 contains a valid reference to a second character structure 70, the bounds evaluation unit 26 retrieves the character patterns stored in the first and second character structures 70. Herein, the character pattern stored in the first character structure 70 is referred to as a first character pattern 80, and the character pattern stored in the second character structure 70 is referred to as a second character pattern 82. Taken together, the first and second character patterns 80, 82 form a character pattern pair 84 corresponding to a first character pair within the handwritten training word currently under consideration.

Figure 5A:
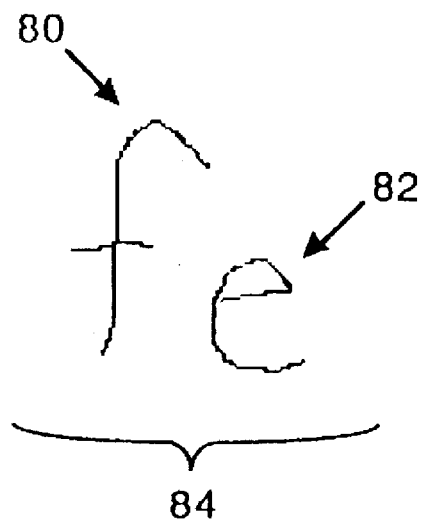
FIG. 5A is a graphical representation of a first character pattern and a second character pattern within the exemplary handwritten training word of FIG. 2, together forming a character pattern pair.

To aid understanding, it is assumed herein that the handwritten training word currently under consideration is the exemplary handwritten training word 50 of FIG. 2. Referring now to FIG. 5A, a graphical representation of a character pattern pair 84 corresponding to the exemplary handwritten training word 50 of FIG. 2 is shown. The first character pattern 80 within the character pattern pair 84 corresponds to the first handwritten letter within the exemplary handwritten training word 50, namely, "f." The second character pattern 82 corresponds to the second handwritten character, that is, "e."

After retrieving the first and second character patterns 80, 82, the bounds evaluation unit 26 generates a first bounds measurement 90 corresponding to the first character pattern 80, and a second bounds measurement 92 corresponding to the second character pattern 82. In the preferred embodiment, each bounds measurement is a bounding box that defines the left-most, right-most, top-most, and bottom-most extent, or boundary, of its corresponding character pattern in coordinate values. In the preferred embodiment, the bounds evaluation unit 26 generates the first bounds measurement 90 by searching the first character pattern 80 for a minimum and a maximum x-coordinate value, thereby determining a left and a right boundary for the first bounds measurement 90; and searching for a minimum and a maximum y-coordinate value to respectively determine a top and a bottom boundary for the first bounds measurement 90. Those skilled in the art will recognize that herein, the minimum y-coordinate values are conventionally associated with the top of a raster-oriented computer system display device. The bounds evaluation unit 26 generates the second bounds measurement 92 in a manner analogous to that described above for the first bounds measurement 90.

Figure 5B:
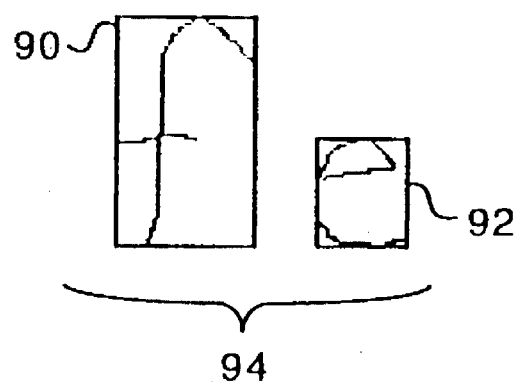
FIG. 5B is a block diagram of a first bounds measurement and a second bounds measurement respectively overlaid upon and corresponding to the first character pattern and second character pattern of FIG. 5A, together forming a bounds measurement pair.

Referring now to FIG. 5B, a block diagram of a first bounds measurement 90 and a second bounds measurement 92 generated from and overlaid upon the first and second character patterns 80, 82, respectively, of FIG. 5A is shown. As can be seen from FIG. 5B, the first bounds measurement 90 is a bounding box having left and right boundaries given by the first character pattern's smallest and largest x-coordinate values, respectively; and top and bottom boundaries given respectively by the smallest and largest y-coordinate values associated with the first character pattern 80. The second bounds measurement 92 is defined in an analogous manner from the second character pattern 82. Taken together, the first and second bounds measurements 90, 92 form a bounds measurement pair 94. The bounds evaluation unit 26 preferably stores the coordinate values defining the bounds measurement pair 94 in the bounds measurement memory 36 in order of the left, right, top, and bottom coordinate values that define the first bounds measurement 90, followed by the left, right, top, and bottom coordinate values that define the second bounds measurement 92. Those skilled in the art will recognize that in an alternate embodiment, the bounds evaluation unit 26 could generate another type of bounds measurement rather than a bounding box. For example, each bounds measurement could be the five parameters defining an ellipse that follows a contour of a bi-variate Gaussian distribution model of the coordinate values.

Figure 6:
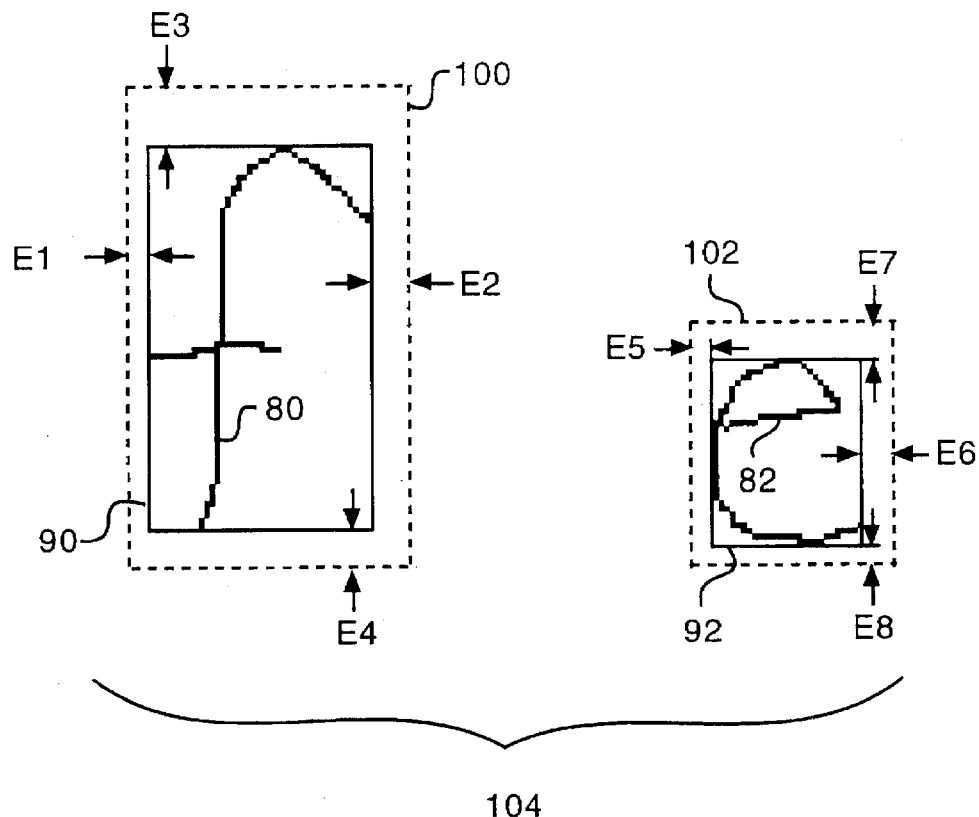
FIG. 6 is a block diagram of a bounds model pair of the present invention, corresponding to and overlaid upon the bounds measurement pair of FIG. 5B.

After generating the bounds measurement pair 94, the bounds evaluation unit 26 generates a corresponding bounds model pair 104, and performs comparison operations to compare the bounds measurement pair 94 against the corresponding bounds model pair 104. The bounds model pair generation and comparison operations will be described in detail below. Referring now to FIG. 6, a block diagram of an exemplary bounds model pair 104 overlaid upon the bounds measurement pair 94 of FIG. 5B is shown. Each bounds model pair 104 comprises a first bounds model 100 and a second bounds model 102. Each bounds model pair 104 indicates the character pattern sizes and character pattern positionings that would be expected for a character pattern pair 84 corresponding to a first hypothesized character identifier and a second hypothesized character. In FIG. 6, the first and second bounds models 100, 102 are shown larger than the first and second bounds measurements 90, 92 of FIG. 5B for illustrative purposes. As will be described in detail below, the first and second bounds measurements 90, 92 are scaled to match the first and second bounds models 100, 102 much more closely than shown in FIG. 5B. In the preferred embodiment, the left, right, top, and bottom coordinate values defining each of the first and second bounds models 100, 102 are initially assigned predetermined estimated values. During the bounds model training operations, bounds model pairs 104 are trained, or updated, according to bounds measurement pairs 94 associated with the handwritten training words as will be described in detail below.

Figure 7:
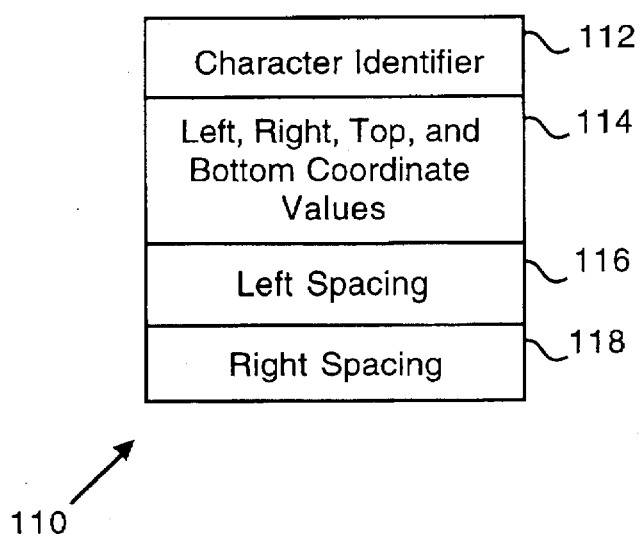
FIG. 7 is a block diagram of a bounds model structure of the present invention.

In the present invention, each bounds model 100, 102 is stored in the bounds model memory 38 within a bounds model structure 110. Referring now to FIG. 7, a block diagram of a preferred embodiment of a bounds model structure 110 is shown. The bounds model structure 110 is a data structure having a first data field 112 for storing a character identifier; a second data field 114 for storing left, right, top, and bottom coordinate values defining the bounds model associated with the character identifier stored in the first data field 112; a third data field 116 for storing an average left spacing value; and a fourth data field 118 for storing an average right spacing value. The average left and right spacing values are additional values associated with each character identifier and that are used in generating an appropriately-spaced bounds model pair 104 from individually-stored first and second bounds models 100, 102, as will be described in detail below. The left, right, top, and bottom coordinate values, the left spacing value, and the right spacing value are collectively referred to herein as bounds model parameters for their associated bounds model.

The bounds evaluation unit 26 searches the bounds model memory 38 for a bounds model structure 110 having a first data field 112 that matches the character identifier stored in the first character structure's character identifier list, and uses the left, right, top, and bottom coordinate values stored within the bounds model structure 110 as the first bounds model 100. As described above, when performing the training operations, the word recognition unit 22 stores only one character identifier in each character structure's character identifier list, namely, that character identifier that associates the character structure 70 with a known character. The bounds evaluation unit 26 next searches the bounds model memory 38 for a bounds model structure 110 having a first data field 112 that matches the character identifier stored in the second character structure's character identifier list, and uses the left, right, top, and bottom coordinate values stored therein as the second bounds model 102. The bounds evaluation unit 26 then generates a bounds model pair 104 from the first and second bounds models 100, 102 by displacing the coordinate values defining the second bounds model 102 along the x-dimension until the distance between the right boundary of the first bounds model 100 and the left boundary of the second bounds model 102 equals the average of the right spacing value associated with the first bounds model 100 and the left spacing value associated with the second bounds model 102.

The bounds model pair 104 generation described above is appropriate for writing systems based upon a left-to-right character positioning rule. In other writing systems, other spacing values, placement rules or other bounds model structures 110 would be appropriate. For example, an embodiment that recognizes diacritical marks above vowels as separate characters would need a variation upon the bounds model structure 110 to represent a vertical spacing for such marks. Those skilled in the art will realize that pair comparisons in such embodiments may not be strictly between pairs corresponding to sequentially-entered characters.

The bounds evaluation unit 26 initiates the aforementioned comparison operations by first aligning the bounds measurement pair 94 with the bounds model pair 104 currently under consideration. The alignment is performed by displacing each of the bounds measurement and bounds model pairs 94, 104 to have zero-mean x and y parameters. The bounds evaluation unit 26 then scales the bounds measurement pair 94 to have the same sum-of-squares of x and y parameters as the bounds model pair 104. The scale of the bounds model pair 104 is not modified. After scaling the bounds measurement pair 94, the bounds evaluation unit 26 determines a set of error values that indicate the relative differences between the parameters of the bounds measurement pair 94 and those of the bounds model pair 104 currently under consideration. In the preferred embodiment, the error values include an error E1 indicating the difference in x-coordinate values between the left boundary of the first bounds measurement 90 and the left boundary of the first bounds model 100; an error E2 indicating the difference in x-coordinate values between the right boundary of the first bounds measurement 90 and the right boundary of the first bounds model 100; an error E3 indicating the difference in y-coordinate values between the top boundary of the first bounds measurement 90 and the top boundary of the first bounds model 100; and error E4 indicating the difference in y-coordinate values between the bottom boundary of the first bounds measurement 90 and the bottom boundary of the first bounds model 100; an error E5 indicating the difference in x-coordinate values between the left boundary of the second bounds measurement 92 and the left boundary of the second bounds model 102; an error E6 indicating the difference in x-coordinate values between the right boundary of the second bounds measurement 92 and the right boundary of the second bounds model 102; an error E7 indicating the difference in y-coordinate values between the top boundary of the second bounds measurement 92 and the top boundary of the second bounds model 102; and an error E8 indicating the difference in y-coordinate values between the bottom boundary of the second bounds measurement 92 and the bottom boundary of the second bounds model 102. To aid understanding, each of the errors E1 through E8 are shown in FIG. 6. Those skilled in the art will recognize that in an alternate embodiment, the set of error values could be defined in a different manner.

After determining the set of error values E1 through E8, the bounds evaluation unit 26 trains, or updates the boundaries of the bounds model pair 104 currently under consideration. In one embodiment, the bounds model pair training is performed according to a conventional gradient-descent method. In the conventional gradient-descent method, for each error value E1 through E8, an adjustment sign is determined for each left, right, top, bottom, left spacing and right spacing parameters associated with the bounds model pair 104 to indicate whether each such parameter should be adjusted in a positive or negative direction in order to minimize each error value E1 through E8. An incremental adjustment value is then added to each parameter value according to the corresponding adjustment sign, in proportion to the magnitude of each error value E1 through E8, and in proportion to the sensitivity of each error value to each parameter value, where each sensitivity is given by a partial derivative.

In a simplification of the gradient-descent method, rather than adjust each bounds model parameter according to each error value and each aforementioned partial derivative, in the preferred embodiment the bounds evaluation unit 26 adjusts each bounds model parameter value in proportion to the most directly-corresponding error value. For example, the left x-coordinate value of the first bounds model 100 is adjusted in proportion to E1, and the other left, right, top, and bottom coordinate values of the first and second bounds models 100, 102 are adjusted in the same proportion to the corresponding errors E2 through E8. In addition, the right-spacing value of the first bounds model 100 and the left-spacing value of the second bounds model 102 are adjusted in equal amounts in proportion to the sum of error values E2 and E5 (or the difference, depending upon the manner in which they are defined, as will be obvious to those skilled in the art). The adjusted bounds model parameters for the first bounds model 100 and the second bounds model 102 are then stored back into the corresponding bounds model structures 110.

Figures 8, 9:
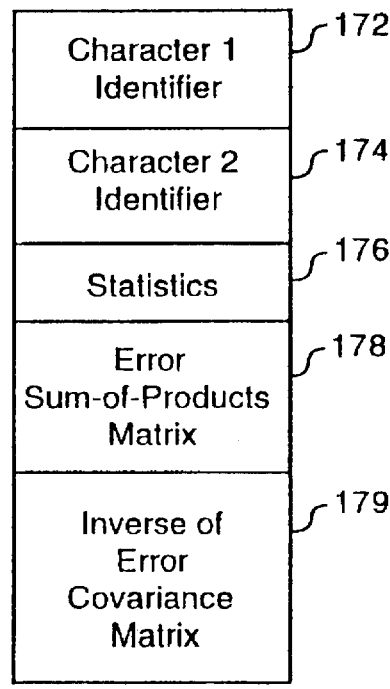
FIG. 8 is an error sum-of-products matrix of the present invention.
FIG. 9 is a block diagram of a covariance structure of the present invention.
Figure 10:
FIG. 10 is an error covariance matrix of the present invention.

After training the bounds model pair 104, the bounds evaluation unit 26 updates an error sum-of-products matrix 160 corresponding to the bounds model pair 104 currently under consideration. Referring now to FIG. 8, a preferred embodiment of an error sum-of-products matrix 160 is shown. The error sum-of-products matrix 160 is a matrix in which each (row, column) entry is a sum-of-products value for a pair of error values, as shown in FIG. 10. The bounds evaluation unit 26 preferably updates the error sum-of-products matrix 160 by treating the set of error values E1 through E8 as a vector, taking the outer product of this vector with itself, and adding the result to the error sum-of-products matrix 160.

In the preferred embodiment, the error sum-of-products matrix 160 is stored in a covariance structure 170. Referring now to FIG. 9, a block diagram of a covariance structure 170 is shown. The covariance structure 170 is a data structure having a first data field 172 for storing a first character identifier; a second data field 174 for storing a second character identifier; a third data field 176 for storing bounds model pair statistics; a fourth data field 178 for storing the error sum-of-products matrix 160; and a fifth data field 179 for storing an inverse error covariance matrix 180, which is described in detail below with reference to FIG. 10. In the preferred embodiment, the bounds model pair statistics include a bounds measurement pair count indicating a number of bounds measurement pairs 94 that have been used to train the corresponding bounds model pair 104. Preferably, each covariance structure 170 is stored in the bounds model memory 38. After updating the error sum-of-products matrix 160, the bounds evaluation unit 26 increments the bounds measurement pair count stored in the covariance structure's third data field 176.

Once the bounds model pair 104 has been trained and the set of error values E1 through E8 have been incorporated into the error sum-of-products matrix 160, the bounds evaluation unit 26 determines whether the second character structure's fourth data field 78 contains a valid reference to a next, or third, character structure 70. If not, the bounds evaluation unit 26 selects a next word structure 60 for consideration. If the second character structure's fourth data field 78 references a third character structure 70, the bounds evaluation unit 26 retrieves the character pattern stored in the third character structure's first data field 72. The bounds evaluation unit 26 then treats the second character structure's character pattern as a first character pattern 80, and the third character structure's character pattern as a second character pattern 82, and repeats the above operations. That is, the bounds evaluation unit 26 generates a corresponding bounds measurement pair 94, performs the comparison operations described above to determine a corresponding set of error values E1 through E8, trains the boundaries of the corresponding bounds model pair 104, and incorporates the set of error values E1 through E8 into the corresponding error sum-of-products matrix 160. The bounds evaluation unit 26 repeats the above operations for each sequential pair of character patterns associated with the selected word structure 60, after which the bounds evaluation unit 26 repeats the above operations for a next word structure 60.

Once each word structure 60 that the word recognition unit 22 created after receiving the initiate training signal has been considered, the bounds evaluation unit 26 performs error covariance matrix generation operations. The bounds evaluation unit 26 initiates the error covariance matrix generation operations by selecting a first covariance structure 170. The bounds evaluation unit 26 then retrieves and normalizes the error sum-of squares matrix 150 within the selected covariance structure 170 according to the bounds measurement pair count to produce an error covariance matrix 180. Referring now to FIG. 10, a preferred embodiment of an error covariance matrix 180 is shown. The error covariance matrix 180 is preferably a conventional 8-by-8 covariance matrix in which each non-diagonal entry is a covariance between error values, and each diagonal entries is an error value variance. For example, in FIG. 10, the (row 1, column 2) entry in the error covariance matrix 180 is the covariance between all E1 values and all E2 values incorporated into the error sum-of-products matrix 160. Similarly, the (row 8, column 8) entry in the error covariance matrix 180 is the variance exhibited by all E8 values incorporated into the error sum-of-products matrix 160. After generating the error covariance matrix 180, the bounds evaluation unit 26 calculates and stores its inverse in the covariance structure's fifth data field 159, for use during bounds measurement recognition operations as will be described in detail below. The bounds evaluation unit 26 subsequently generates and inverts an error covariance matrix 180 for each covariance structure 170 that was considered during the above comparison and bounds model training operations, after which the error covariance matrix generation operations are complete. Upon completion of the error covariance matrix generation operations, the bounds model training operations are complete, and the bounds evaluation unit 26 issues the bounds model training completion signal.

Those skilled in the art will recognize that two problems may arise with the embodiment as just described as related to the generation of the inverse of the error covariance matrix 180. The first problem arises from the manner in which bounds measurements and bounds models are aligned, the error covariance matrix 180 may not be a full-rank matrix, and therefore its inverse may not exist. Methods are well-known in the art to avoid this problem by generating approximate inverse matrices. In the preferred embodiment, each diagonal element of the error covariance matrix 180 is multiplied by 1.1 before the inversion is attempted, which leads to acceptable results. The second problem arises from the limited number of handwritten training words that can be considered relative to the number of possible character pairs within an alphabet. Because any set of handwritten training words is limited, many character pairs will never or seldom be seen, and the aforementioned bounds measurement pair counts will be too low to lead to acceptable estimates of error value covariances. This problem may be solved by grouping character pattern pairs 84 into classes, and estimating error value covariances for each such class, as is well-known in the art. In a preferred embodiment limited to writing systems based upon a left-to-right character positioning rule, a single class is used for all character pattern pairs 84, and the individual covariance structures 170 are replaced by a single covariance class structure (not shown) that includes a grand error sum-of-products matrix and the inverse of a grand error covariance matrix. This single-class, or "grand covariance" approach is well known in the pattern recognition art. In a handwriting recognition system that includes recognition of diacritical marks, a preferred embodiment includes a first covariance class structure for left-to-right relationships, and a second covariance class structure for vertical relationships, with a separate grand error covariance matrix for each of the first and second covariance class structures. In a more complex writing system such as Chinese, the system 10 as described above is the preferred embodiment.

A person skilled in the art will realize that further simplifications to the embodiments described herein are possible. For example, use of diagonal error variance terms rather than the error covariance terms as defined herein may be possible in an alternate embodiment, with some impact on accuracy depending upon the amount of training data and other system parameter values. It will also be understood by those skilled in the art that other more complex training procedures may be advantageous. For example, making several training passes over the same set of training data, varying the order in which handwritten training words are considered, and/or varying pattern recognition model learning rate or proportionality parameters may lead to improved results in terms of minimization of error values E1 through E8 generated during the comparison operations described above.

Figure 11:
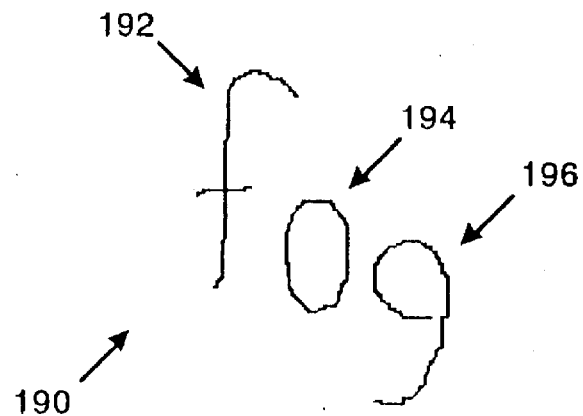
FIG. 11 is a graphical representation of an exemplary unknown handwritten word upon which handwriting recognition operations are performed.

In response to the bounds measurement recognition signal issued by the word recognition unit 22, the bounds evaluation unit 26 initiates bounds measurement recognition operations by selecting a first word structure 60. Preferably, the first word structure 60 corresponds to a first unknown handwritten word that was entered by a user. Referring now to FIG. 11, a graphical representation of an exemplary unknown handwritten word 190 upon which handwriting recognition operations are performed is shown. The exemplary unknown handwritten word 190 is the word and comprises an f-shaped character pattern 192, an o-shaped character pattern 194, and a g-shaped character pattern 196. After selecting the first word structure 60, the bounds evaluation unit 26 selects a first character structure 70 by retrieving the contents of the selected word structure's third data field 66. Next, the bounds evaluation unit 26 determines whether the first character structure's 70 fourth data field 78 references a next, or second, character structure 70. If not, the bounds evaluation unit 26 selects a next word structure 60 for consideration, or returns the bounds measurement completion signal in the event that all word structures 60 have been considered.

In the event that the first character structure's fourth data field 78 references a second character structure 70, the bounds evaluation unit 26 retrieves the character pattern stored in the first character structure 70 and the character pattern stored in the second character structure 70. The bounds evaluation unit 26 uses the character pattern retrieved from the first character structure 70 as a first character pattern 80, and the character pattern retrieved from the second character structure 70 as a second character pattern 82 in the same manner as described above for the bounds model training operations. Thus, for the exemplary unknown handwritten word 190 of FIG. 11, the first character pattern 80 is the f-shaped character pattern 192, and the second character pattern 82 is the o-shaped character pattern 194. The bounds evaluation unit 26 next creates a bounds measurement pair 94 comprising a first bounds measurement 90 corresponding to the first character pattern 80, and a second bounds measurement 92 corresponding to the second character pattern 82, in the manner previously described above for the bounds model training operations.

After creating the bounds measurement pair 94, the bounds evaluation unit 26 retrieves a first hypothesized character identifier stored in the first character structure's character identifier list, and retrieves a first hypothesized character identifier stored in the second character structure's character identifier list. The bounds evaluation unit 26 then generates a bounds model pair 104 and performs the comparison operations described above, thereby generating a set of error values E1 through E8 that indicate the relative differences between the boundaries of the bounds measurement pair 94 and those of the bounds model pair 104 corresponding to the pair of hypothesized character identifiers currently under consideration. The bounds evaluation unit 26 subsequently searches the bounds model memory 38 for a covariance structure 170 having a first data field 172 that matches the first hypothesized character identifier retrieved from the first character structure 70, and a second data field 174 that matches the first hypothesized character identifier retrieved from the second character structure 70.

Those skilled in the art will recognize that each error covariance matrix 180 defines an 8-dimensional Gaussian probability distribution. Those skilled in the art will also recognize that a set of error values E1 through E8, when treated as a column vector, can be used to generate a likelihood value corresponding to this Gaussian probability distribution. The likelihood value is proportional to exp $[-(E^T*C^{-1}*E)/2]$, where E represents a column vector of error values E1 through E8, $E^T$ represents a row vector of error values E1 through E8, and $C^{-1}$ represents the inverse of the error covariance matrix 180. In the present invention, the pairwise cost value is defined proportional to the negative log of this likelihood value, namely, $(E^T*C^{-1}*E)$, which is a non-negative scalar value.

The bounds evaluation unit 26 generates a pairwise cost value associated with the pair of hypothesized character identifiers currently under consideration by sequentially multiplying the transpose of a column vector defined by the set of error values E1 through E8, the inverse of the error covariance matrix 180 stored in the covariance structure 170 currently under consideration, and the column vector defined by the set of error values E1 through E8. The pairwise cost value provides a probabilistic similarity measure between the bounds measurement pair 94 and the bounds model pair 104 corresponding to the first character structure's first hypothesized character identifier and the second character structure's first hypothesized character identifier. Those skilled in the art will recognize that a smaller pairwise cost value indicates greater similarity. Those skilled in the art will also recognize that in general, any type of pairwise similarity measure could be used in place of the pairwise cost value described herein.

Figure 12:
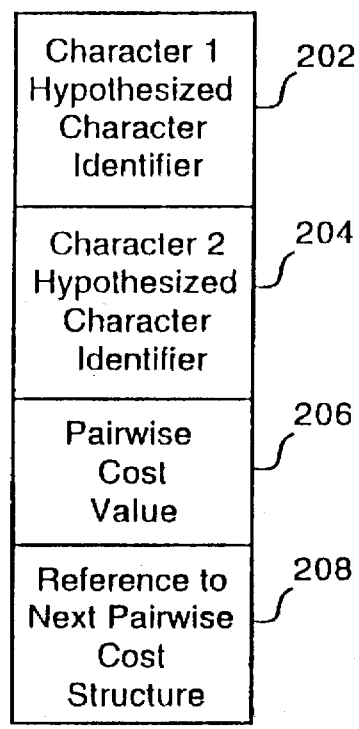
FIG. 12 is a block diagram of a preferred embodiment of a pairwise cost structure of the present invention.
Figure 12:

After generating the pairwise cost value associated with the hypothesized character identifiers currently under consideration, the bounds evaluation unit 26 creates a corresponding pairwise cost structure 200. Referring now to FIG. 12, a block diagram of a preferred embodiment of a pairwise cost structure 200 is shown. The pairwise cost structure 200 is a data structure having a first data field 202 for storing the first hypothesized character identifier retrieved from the first character structure 70, a second data field 204 for storing the first hypothesized character identifier retrieved from the second character structure 70, a third data field 206 for storing the corresponding pairwise cost value, and a fourth data field 208 for storing a reference to a next pairwise cost structure 200. In the preferred embodiment, the bounds evaluation unit 26 stores each pairwise cost structure 200 in the first character structure's pairwise cost structure list.

The bounds evaluation unit 26 subsequently determines whether a next hypothesized character identifier is stored in the second character structure's character identifier list. If so, the bounds evaluation unit 26 selects the next hypothesized character identifier associated with the second character structure 70. The bounds evaluation unit 26 performs the above operations to create and store a corresponding pairwise cost structure 200. The bounds evaluation unit 26 then repeats the above operations, using the bounds model pair 104 specific to the pair of hypothesized character identifiers currently under consideration, until each hypothesized character identifier within the second character structure's character identifier list has been considered.

After each hypothesized character identifier within the second character structure's character identifier list has been considered, the bounds evaluation unit 26 determines whether the first character structure's character identifier list contains a next hypothesized character identifier. If so, the bounds evaluation unit 26 repeats the above operations, until each hypothesized character identifier within the first character structure's character identifier list has been considered. Thus, for each pairwise combination of hypothesized character identifiers between the first and second character structures 70 as described above, the bounds evaluation unit 26 generates a corresponding pairwise cost structure 200 storing a pairwise cost value.

The bounds evaluation unit 26 next determines whether the second character structure's fourth data field 78 contains a reference to a next, or third, character structure 70. If so, the bounds evaluation unit 26 retrieves the character pattern stored within the third character structure 70. The bounds evaluation unit 26 uses the character pattern retrieved from the second character structure 70 as a first character pattern 80, and the character pattern retrieved from the third character structure as a second character pattern 82 to generate a next bounds measurement pair 94. After generating the next bounds measurement pair 94, the bounds evaluation unit 26 repeats the operations described above to generate a pairwise cost structure 200 for each sequential pairwise combination of hypothesized character identifiers between the second and third character structures 70. The bounds evaluation unit 26 repeats the above operations for each sequential pair of character structures 70 associated with the word structure 60 currently under consideration. Once each sequential pair of character structures 70 associated with the word structure 60 currently under consideration has been considered, the bounds evaluation unit 26 determines whether a next word structure 60 is referenced by the currently-selected word structure's fourth data field 68. If so, the bounds evaluation unit 26 selects the next word structure 60 for consideration. The bounds evaluation unit 26 then performs the operations described above to generate a pairwise identity structure 200 for each pairwise combination of hypothesized character identities between each sequential pair of character structures 70 associated with the selected word structure 60. After each word structure 60 created by the word recognition unit 22 following the issuance of the recognize input signal has been considered, the bounds measurement recognition operations are complete, and the bounds evaluation unit 26 issues the bounds measurement completion signal.

As explained above, the word recognition unit 22 completes the handwriting recognition operations after receiving the bounds measurement completion signal by searching for a word identifier in the lexicon that minimizes a sum of character and pairwise cost terms, using the pairwise cost structures 200 to access pairwise cost values associated with transitions from one character identifier to another in a pairwise fashion.

Figure 13:
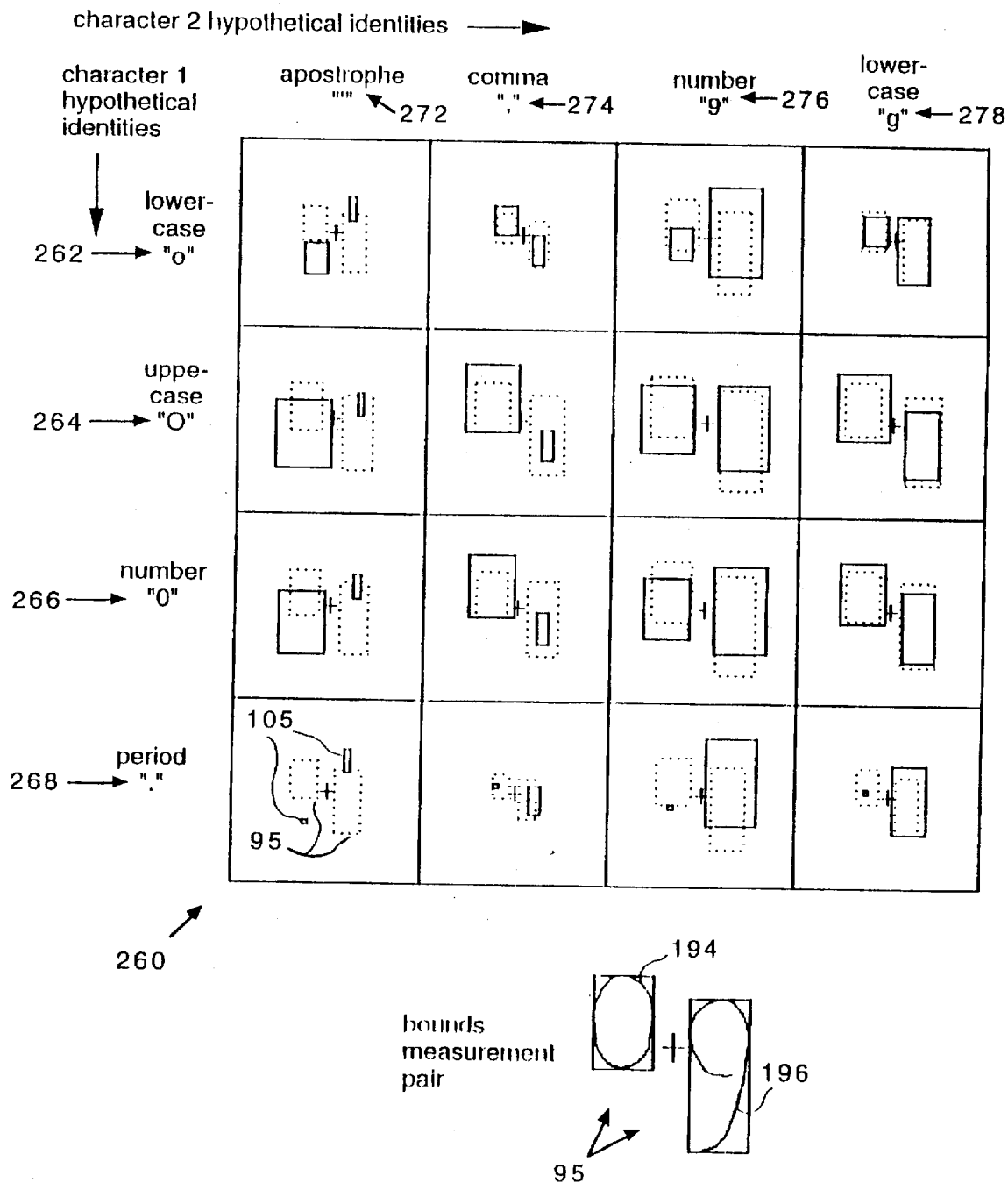
FIG. 13 is an illustration of an exemplary bounds measurement pair and an array of exemplary bounds measurement pair to bounds model pair comparisons.

To further detail the operation of the present invention and to contrast the handwriting recognition capabilities provided by the present invention against the prior art, an exemplary bounds measurement pair 95 and an array 260 of exemplary bound measurement pair 95 to exemplary bounds model pair 105 comparisons is shown in FIG. 13. The exemplary bounds measurement pair 95 corresponds to the o-shaped character pattern 194 and the g-shaped character pattern within the exemplary unknown handwritten word 190 of FIG. 11. It is assumed herein that the character recognition unit 24 has determined a first through a fourth hypothesized character identifier 262, 264, 266, 268 for the o-shaped character pattern 194; and a first through a fourth hypothesized character identifier 272, 274, 276, 278 for the g-shaped character pattern 196. For the o-shaped character pattern 194, the first hypothesized character identifier 262 corresponds to a lower-case "o," the second hypothesized character identifier 264 corresponds to an upper-case "O," the third hypothesized character 266 corresponds to the number 0; and the fourth hypothesized character identifier 268 corresponds to a period. For the g-shaped character pattern 196, the first hypothesized character identifier 272 corresponds to an apostrophe, the second hypothesized character identifier 274 corresponds to a comma, the third hypothesized character identifier 276 corresponds to the number 9, and the fourth hypothesized character identifier 278 corresponds to a lower-case "g." The bounds evaluation unit 26 performs comparison operations between the exemplary bounds measurement pair 95 and an exemplary bounds model pair 105 corresponding to each unique combination of hypothesized character identifiers described above for the o-shaped and g-shaped character patterns 194, 196. Thus, for the example currently considered, the bounds evaluation unit 26 performs a total of 16 exemplary bound measurement pair 95 to exemplary bounds model pair 105 comparisons.

Each exemplary bounds model pair 105 in the array 260 is shown using solid lines, and the exemplary bounds measurement pair 95 in the array 260 is shown using dashed lines. For each exemplary bounds model pair 105 considered, that is, for each of the 16 pairs of hypothesized character identifiers considered, the exemplary bounds measurement pair 95 is scaled relative to the exemplary bounds model pair 105 in the manner described above. Thus, as a result of each scaling, the size of the exemplary bounds measurement pair 95 varies according to the size of each exemplary bounds model pair 105 under consideration, as shown in FIG. 13.

The "+" in FIG. 13 indicates a (0, 0) x-y coordinate origin. For a given exemplary bounds model pair 105, the magnitudes of the error values E1 through E8 are given by how closely the exemplary bounds model pair 105 matches the scaled exemplary bounds measurement pair 95, as described above. Therefore, the error values E1 through E8 corresponding to the o-shaped character pattern's fourth hypothesized character identifier 268 and the g-shaped character pattern's first hypothesized identifier 272 (that is, the hypothesis that the o-shaped character pattern 194 is a period and the g-shaped character pattern 196 is an apostrophe) are larger than those corresponding to the o-shaped character pattern's second hypothesized character identifier 264 and the g-shaped character pattern's fourth hypothesized character identifier 278. The exemplary bounds model pair 105 that most-closely matches the exemplary bounds measurement pair 95 results in the smallest error values E1 through E8, and therefore results in the smallest pairwise cost value. Thus, the smallest pairwise cost value for the example currently considered corresponds to the hypothesized character identifier pair given by the first hypothesized character identifier 262 for the o-shaped character pattern 194 and the fourth hypothesized character identifier 278 for the g-shaped character pattern 196.

In the present invention, the word recognition unit 22 incorporates each character cost value and each pairwise cost value into the minimum-cost path search as described above. Prior art systems and methods that rely upon the determination of a baseline suffer from an inherent circular dependency because accurate baseline determination requires accurate character identification, while accurate character identification requires accurate baseline determination. Therefore, prior art systems and methods are not capable of accurately incorporating both individual character shape information (i.e., character cost values) and pairwise character size and positioning information (i.e., pairwise cost values) into a conventional minimum-cost path search simultaneously. The simultaneous incorporation of character cost values and pairwise cost values into the minimum-cost path search as described above results in higher-accuracy recognition of handwritten words. Since pairwise comparisons in prior art systems and methods depend upon the determination (i.e., estimation) of a baseline and identification of character descenders and ascenders, those comparisons are inherently dependent upon the sizes and positions of other characters in the word besides the character pair being considered. At best, prior art systems and methods can apply pairwise character size and positioning information to a minimum-cost path search that uses only individual character cost values only after whole-word character sequence hypotheses are enumerated. Because the present invention does not rely upon the determination of a baseline, the identification of character ascenders or descenders, or any other dependencies upon characters beyond the character pair being considered, the present invention does not suffer from this limitation.

Figure 14:
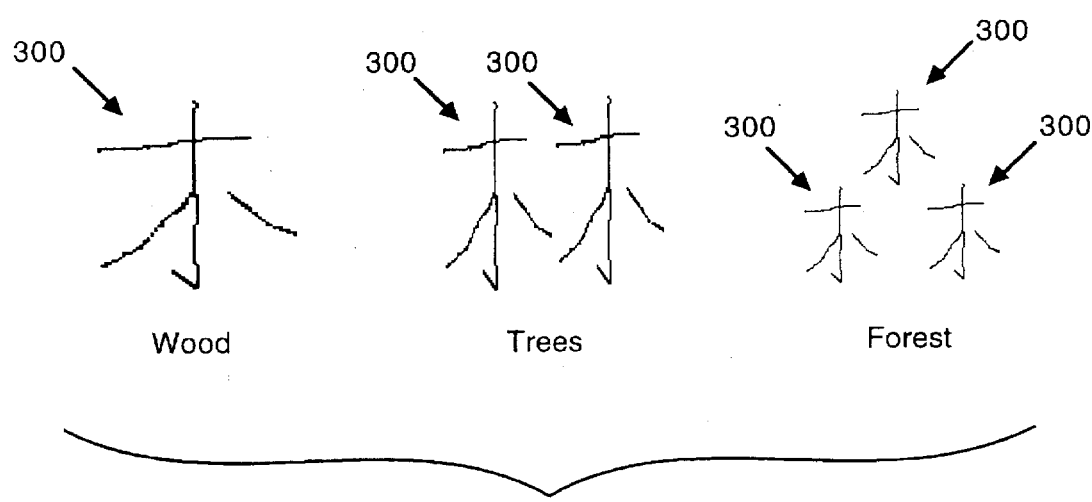
FIG. 14 is a graphical representation of an exemplary set of handwritten Chinese ideographs.
Figure 15:
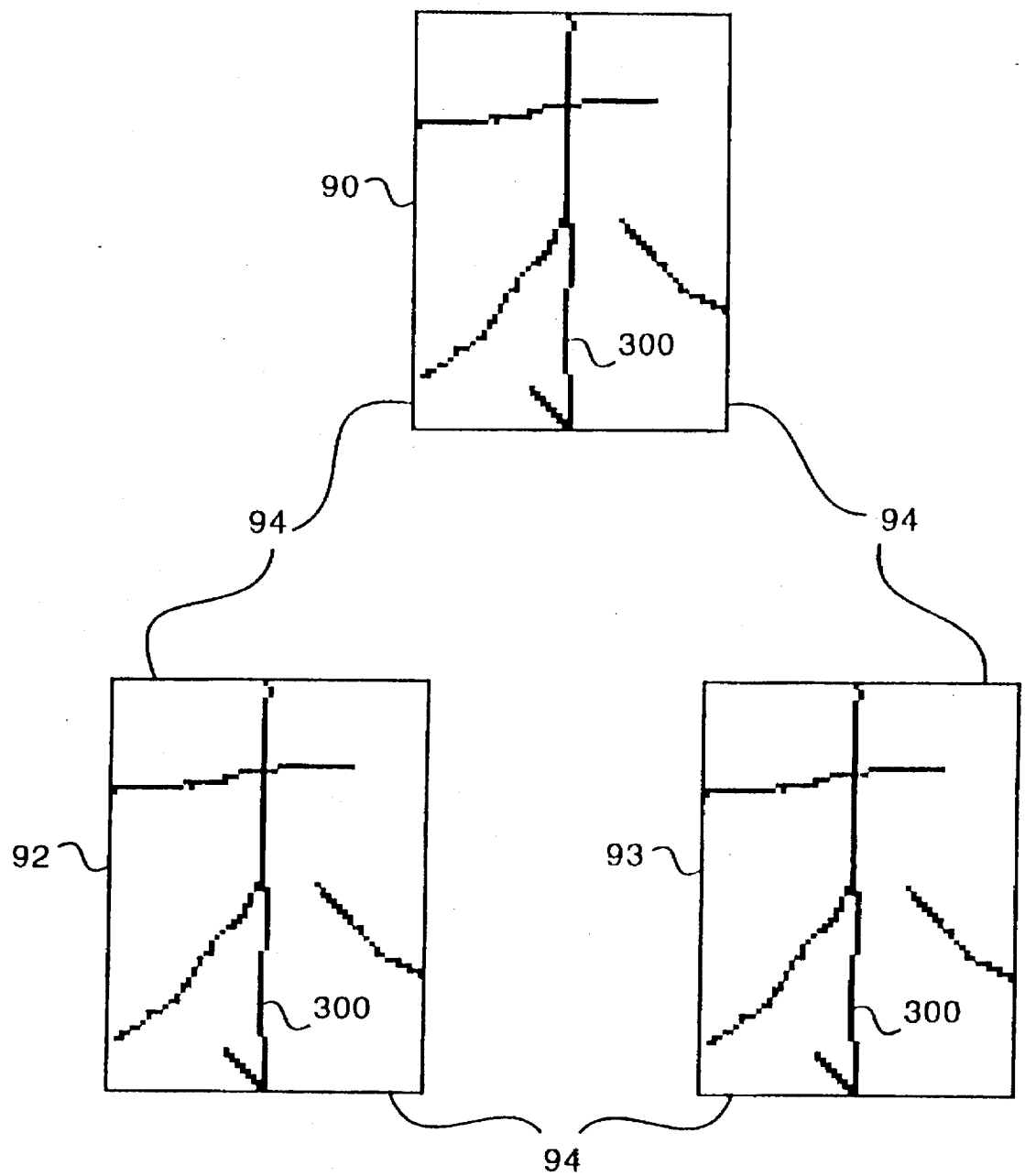
FIG. 15 is a block diagram of a first bounds measurement, a second bounds measurement, and a third bounds measurement for one of the ideographs shown in FIG. 14.

The present invention can be generalized to account for relative character positioning rules other than the left-to-right character positioning rule considered above. For example, those skilled in the art will recognize that the present invention can be readily applied a right-to-left character positioning rule, or to the placement of diacritical marks relative to handwritten characters as previously described. Additionally, the present invention can be applied to Asian language handwriting recognition, as will now be described in detail. Referring now to FIG. 14, a graphical representation of an exemplary set of Chinese ideographs is shown, in which first ideograph has a meaning of "wood"; a second ideograph has a meaning of "trees"; and a third ideograph has a meaning of "forest." Each ideograph comprises one or more radicals 300. In FIG. 15, the ideograph meaning "wood" is itself a radical 300, from which the other ideographs shown are constructed. Each ideograph can thus be interpreted in a manner similar to a Western-language word, and each radical can be interpreted in a manner similar to a Western-language character, in which a radical pattern is a sequence of coordinate pair values analogous to a character pattern. However, in Asian languages, multiple ideographs, each having a unique meaning, may each consist of an identical set of radicals. The unique meaning of each individual ideograph is determined not only by the radical shapes present, but also by relative radical placements and/or radical sizings.

In the present invention, the word recognition unit 22 creates a word structure 60 for each ideograph. In a manner similar to that for characters, the word recognition unit 22 also creates a character structure 70 for each radical associated with a given ideograph. During character recognition operations, the character recognition unit 24 stores one or more hypothesized radical identifiers and corresponding cost values in each character structure's hypothesized character list and character cost value list, respectively.

Figure 16:
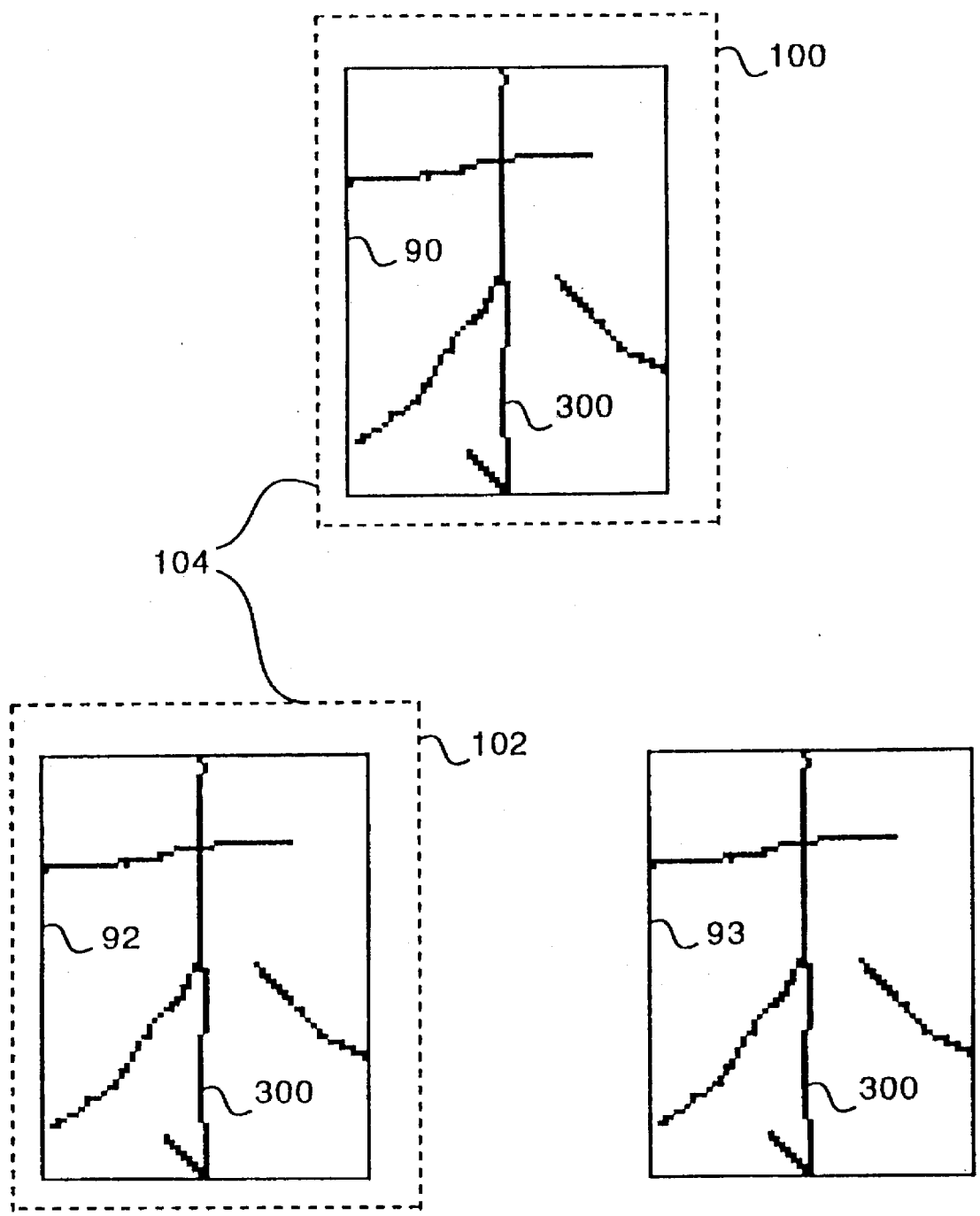
FIG. 16 is a block diagram of a first and a second bounds model respectively corresponding to and overlaid upon the first and the second bounds measurements of FIG. 15 to form a bounds model pair.

For each ideograph containing two or more radicals 300, the bounds evaluation unit 26 generates a bounds measurement for each radical 300, and compares bounds measurement pairs 94 against bounds model pairs 104. Referring now to FIG. 15, a block diagram of a first bounds measurement 90, a second bounds measurement 92, and a third bounds measurement for the ideograph of FIG. 14 meaning "forest" is shown. Referring also now to FIG. 16, a block diagram of a first and a second bounds model 100, 102 respectively corresponding to and overlaid upon the first and second bounds measurements 90, 92 of FIG. 15 to form a bounds model pair 104 is shown.

Unlike Western-language writing systems in which each bounds model pair 104 is uniquely associated with one pair of hypothesized character identifiers, for Asian ideographic languages the bounds model pairs 104 are specific to the manner in which radicals 300 are combined into words, and are therefore stored in the lexicon rather than being constructed from spacing rules as described above. The function of the bounds evaluation unit 26 is therefore accordingly modified in two ways, namely: 1) a pair of hypothesized radical identifiers need only be considered if the pair appears within some entry (i.e., word) in the lexicon (this change could also be made for Western-language writing systems, and could provide a performance advantage when the lexicon is small); and 2) a pair of hypothesized radical identifiers is matched against multiple bounds model pairs 104 if multiple entries in the lexicon use the hypothesized radical identifier pair. The pairwise cost structure 200 is accordingly modified to include a word identity field (not shown). Based on this description, those skilled in the art will recognize that other portions of the present invention would be correspondingly modified for other writing systems.

For the Western-language operations described above, each bounds measurement pair 94 corresponds to a pair of sequentially written characters. A first approach for performing bounds model training and bounds measurement recognition operations for Asian languages is analogous to that for Western languages, in which each bounds measurement pair 94 considered corresponds to a pair of sequentially-written radicals. In this case, the present invention performs the aforementioned operations in the manner described above. A second approach for performing bounds model training and bounds measurement recognition operations considers each unique bounds measurement pair 94 associated with an ideograph, regardless of the order in which each radical was written. In the second approach, for an ideograph having N radicals, the bounds evaluation unit 26 trains and evaluates (N * (N−1))/2 pair relationships, as opposed to the training and evaluation of (N−1) pair relationships via the first approach described above. Thus, in the second approach, three pair relationships would be considered for the three radicals 300 shown in FIG. 16, as opposed to two pair relationships in the first approach.

Figure 17A:
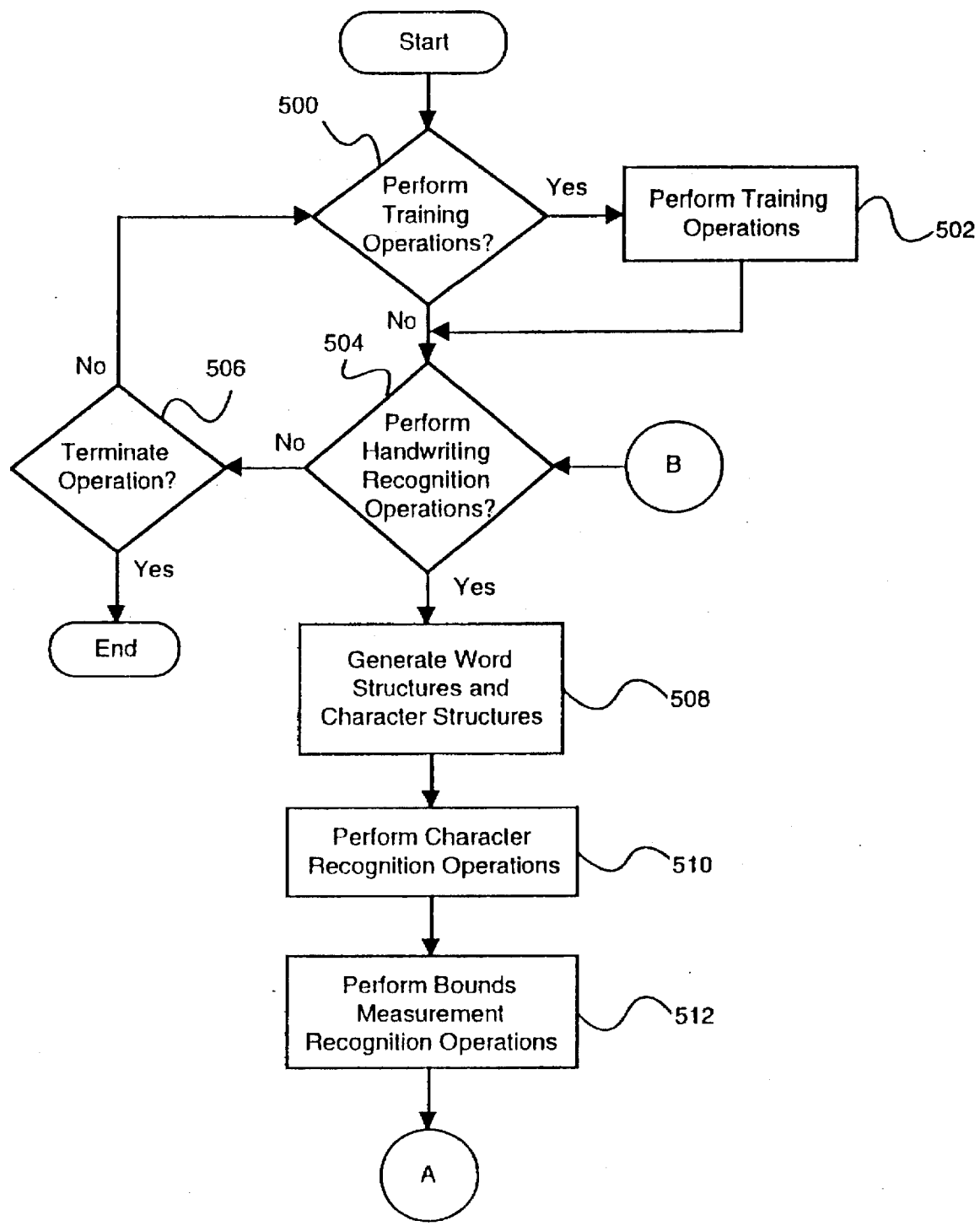
FIGS. 17A and 17B are a flowchart of a preferred method for handwriting recognition using size and placement models in accordance with the present invention.
Figure 17B:
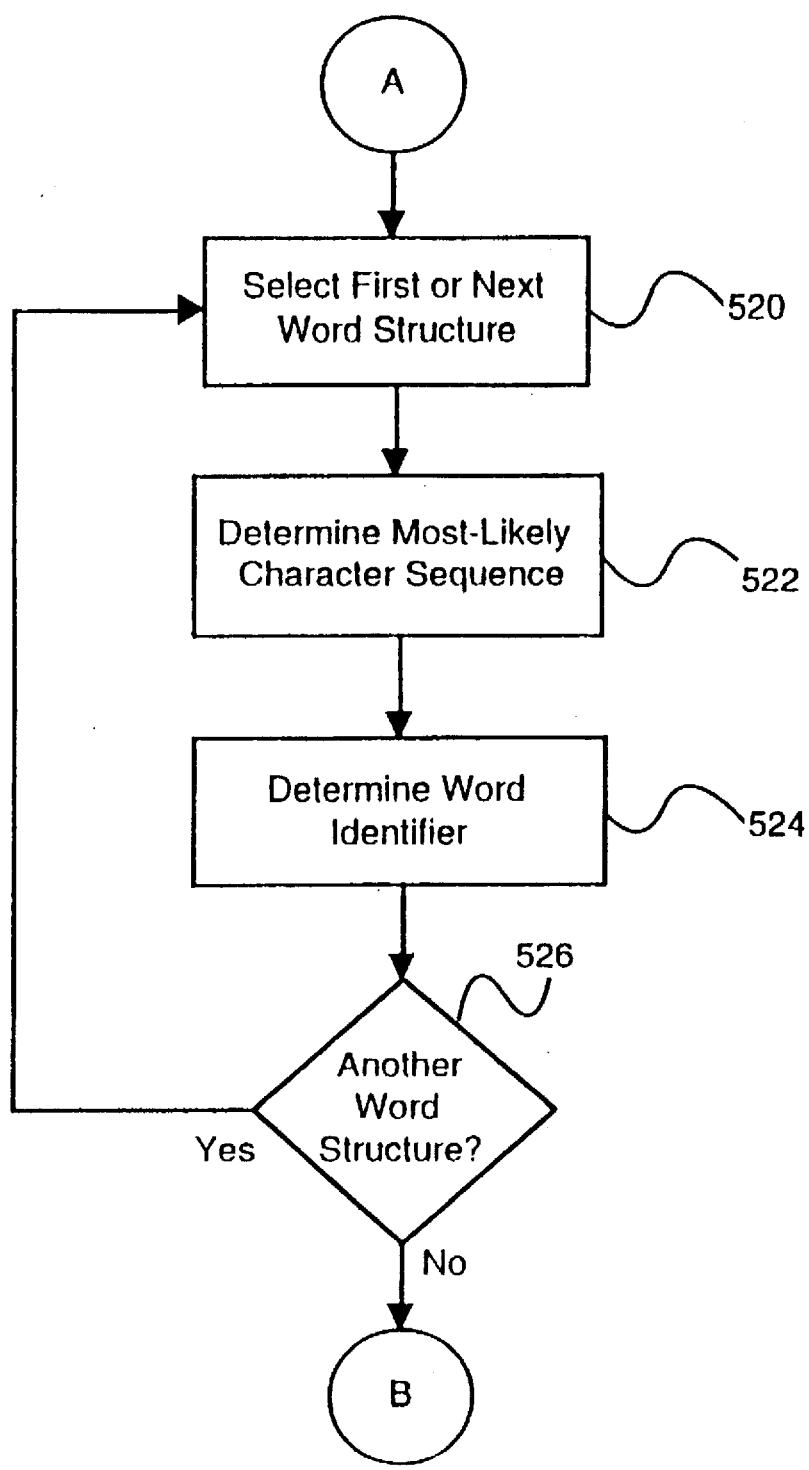

Referring now to FIGS. 17A and 17B, a flowchart of a preferred method for handwriting recognition using shape and placement models is shown. The preferred method begins in step 500 with the word recognition unit 22 determining whether training operations are required. Preferably, the word recognition unit 22 determines that training operations are required in response to the initiate training signal. If training operations are required, the word recognition unit 22 performs the training operations in conjunction with the character recognition unit 24 and the bounds evaluation unit 26 in step 502. The training operations are detailed in flowchart form with respect to FIGS. 18A and 18B below. After step 502, or in the event that training operations are not required, the word recognition unit 22 determines in step 504 whether handwriting recognition operations are required. Preferably, the word recognition unit 22 determines that handwriting recognition operations are required in response to the recognize input signal. If handwriting recognition operations are not required, the word recognition unit 22 next determines in step 506 whether operation is to terminate. If so, the preferred method ends. If operation is to continue, the preferred method returns to step 500.

If it is determined in step 504 that handwriting recognition operations are required, the word recognition unit 22 generates a set of word structures 60 and a set of character structures 70 corresponding to each word structure 60 in step 508, in the manner described above. After step 508, the word recognition unit 22 issues the character recognition signal and the character recognition unit 24 performs character recognition operations in step 512. Step 512 is performed in the manner described above, and results in one or more hypothesized character identifiers being stored in each character structure's character identifier list. For each hypothesized character identifier, a corresponding character cost value is stored in the character structure's character cost value list. Following step 512, the word recognition unit 22 issues the bounds measurement recognition signal, and the bounds evaluation unit 26 performs bounds measurement recognition operations in step 514. Preferably, the bounds measurement recognition operations are performed in the manner described above. The bounds measurement recognition operations will be further detailed in flowchart form below with reference to FIGS. 19A and 19B.

Upon completion of step 514, the word recognition unit 22 selects a next word structure 60 in step 520, or selects a first word structure 60 in the event that a word structure 60 had not been previously selected. Next, the word recognition unit 22 determines a most-likely character identifier sequence from the hypothesized character identifiers, character cost values and pairwise cost values stored in each character structure 70 associated with the selected word structure 60 in step 522. Preferably, step 522 is performed by a minimum-cost path search method as described above. After step 522, the word recognition unit 22 determines a word identifier corresponding to the most-likely character identifier sequence in step 524, in the manner previously described. Following step 524, the word recognition unit 22 determines in step 526 whether another word structure 60 is to be considered. If so, the preferred method returns to step 520. After each word structure 60 has been considered, the preferred method returns to step 504.

Figure 18A:
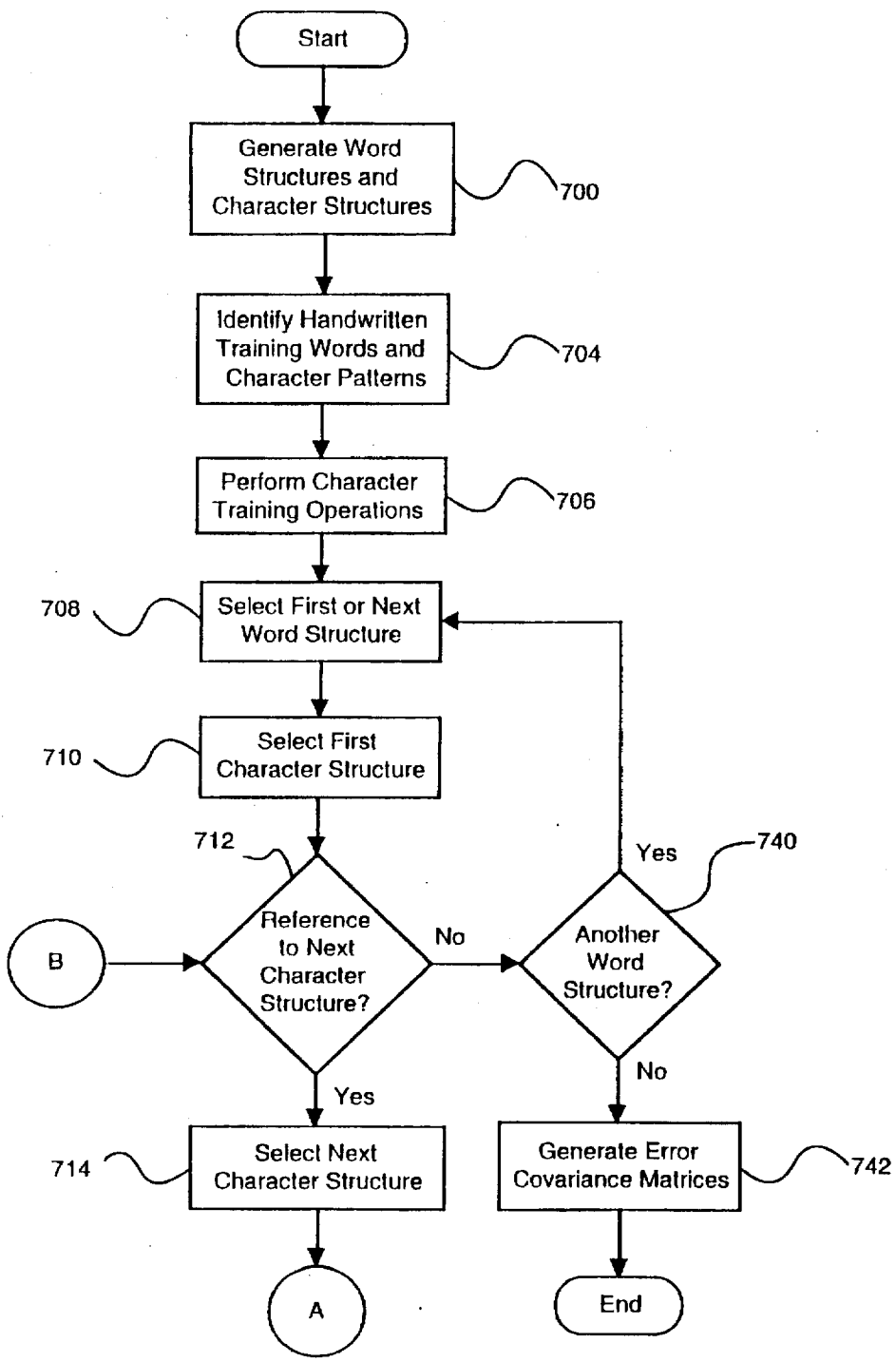
FIGS. 18A and 18B are a flowchart of a preferred method for performing training operations in the present invention.
Figure 18B:
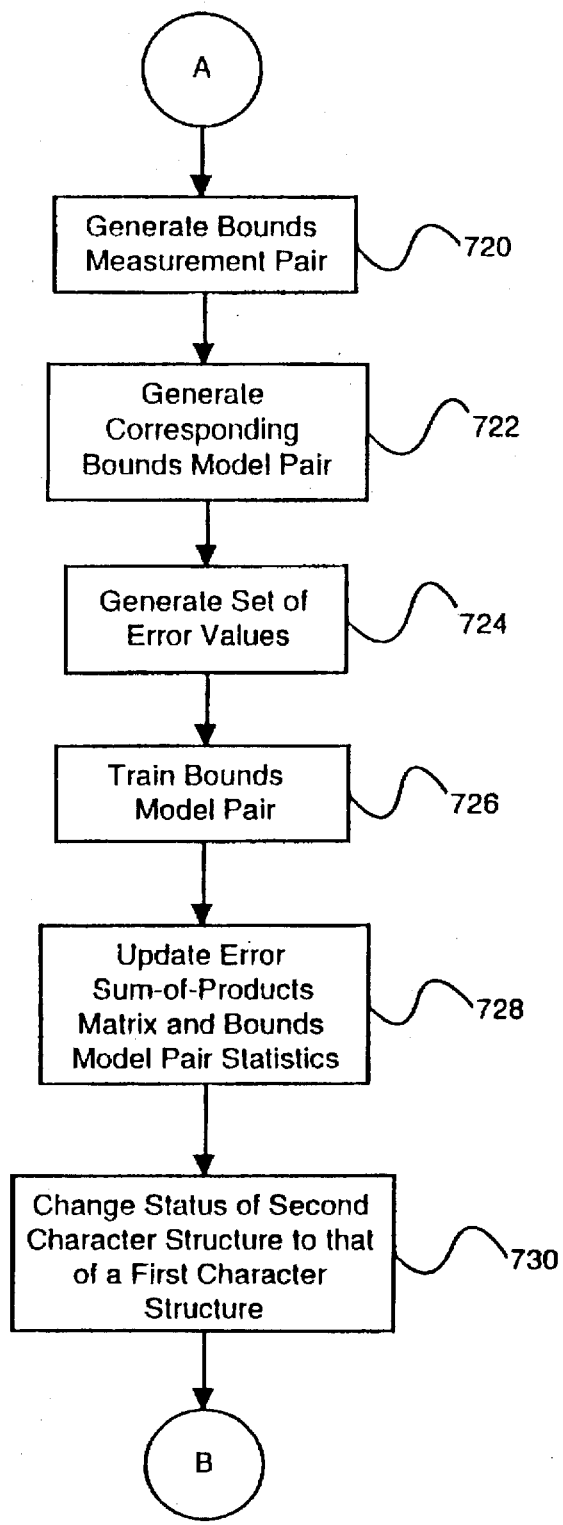

Referring now to FIGS. 18A and 18B, a flowchart of a preferred method for performing training operations (step 502 of FIG. 17A) is shown. The preferred method begins in step 700 with the word recognition unit 22 generating a set of word structures 60 and character structures 70 for a corresponding set of handwritten training words, in the manner described above. Following step 700, the word recognition unit 22 prompts the user to identify each handwritten training word, and determines a known character identifier for each character pattern in step 704, in the manner described above. The word recognition unit 22 then issues the character training signal, and the character recognition unit 24 performs character training operations as previously described in step 706.

After step 706, the word recognition unit 22 issues the bounds model training signal, and the bounds evaluation unit 26 initiates the bounds model training operations by selecting a first word structure in step 708. The bounds evaluation unit 26 then selects the first character structure 70 referenced by the selected word structure 60 in step 710. After step 710, the bounds evaluation unit 26 determines whether the first character structure 70 references a next, or second, character structure 70 in step 712. If so, the bounds evaluation unit 26 selects the second character structure 70 in step 714.

Following step 714, the bounds evaluation unit 26 generates a bounds measurement pair 94 corresponding to the first and second character structures 70 in the manner described above. Next, the bounds evaluation unit 26 retrieves a corresponding bounds model pair 104 in the manner previously described in step 722. After step 722, the bounds evaluation unit 26 scales the bound measurement pair 84 relative to the bounds model pair 104 and generates a set of error values E1 through E8 in step 724, in the manner described above. The bounds evaluation unit 26 then trains the bounds model pair 104 in step 726 in the manner previously described. After step 726, the bounds evaluation unit 26 updates the error sum-of-products matrix 160 and the bounds model pair statistics corresponding to the bounds model pair 104 in step 728, in the manner described above. Next, the bounds evaluation unit 26 changes the status of the second character structure 70 to that of a first character structure 70 in step 730. Following step 730, the preferred method returns to step 712.

If in step 712 it is determined that the first character structure 70 does not reference a second character structure 70, the bounds evaluation unit 26 next determines whether another word structure 60 requires consideration in step 740. If another word structure 60 requires consideration, the preferred method returns to step 708 to select a next word structure 60. Once each word structure 60 has been considered, the bounds evaluation unit 26 generates a set of error covariance matrices 180 in the manner described above in step 742. Following step 742, the preferred method ends.

Figure 19A:
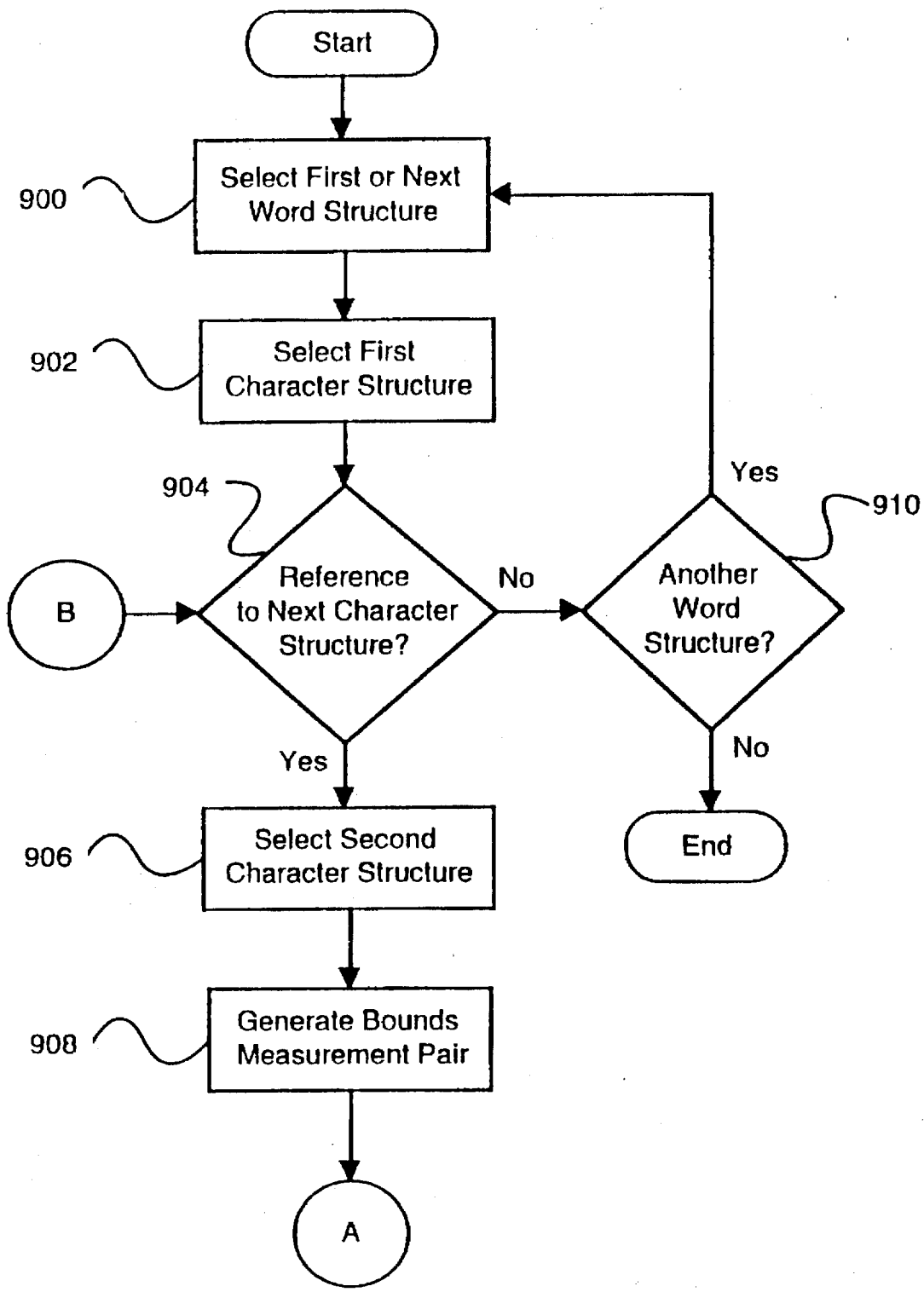
FIGS. 19A and 19B are a flowchart of a preferred method for performing bounds measurement recognition operations in the present invention.
Figure 19B:
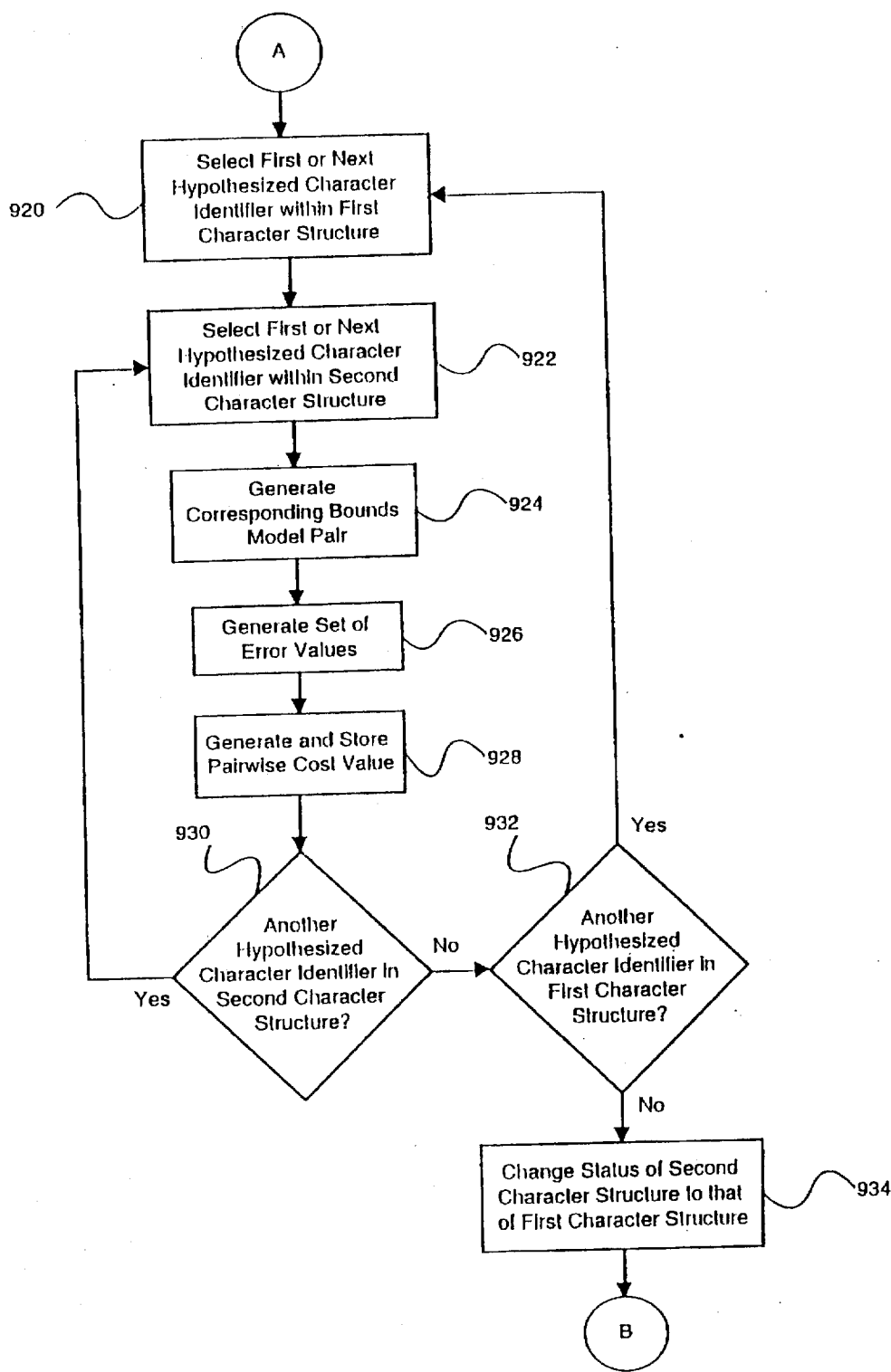

Referring now to FIGS. 19A and 19B, a flowchart of a preferred method for performing bounds measurement recognition operations (step 514 of FIG. 17A) is shown. The preferred method begins in step 900 with the bounds evaluation unit 26 selecting a first word structure 60 for consideration. Next, the bounds evaluation unit 26 selects a first character structure 70 in step 902, in the manner described above. The bounds evaluation unit 26 then determines whether the first character structure 70 references a next, or second, character structure 70 in step 904 as previously described. If the first character structure 70 does not reference a second character structure 70, the bounds evaluation unit 26 next determines whether another word structure 60 requires consideration in step 910. If another word structure 60 requires consideration, the preferred method returns to step 900 to select a next word structure 60. If no other word structure 60 requires considerations in step 910, the preferred method ends.

If it is determined in step 904 that the first character structure 70 references a second character structure 70, the bounds evaluation unit 26 selects the second character structure in step 906. Next, the bounds evaluation unit 26 generates a bounds measurement pair 94 corresponding to the first and second character structures 70 in step 908, in the manner described above. The bounds evaluation unit 26 then selects a first hypothesized character identifier within the first character structure 70 in step 920, in the manner described above. Following step 920, the bounds evaluation unit 26 selects a first hypothesized character identifier within the second character structure 70 in step 922, in the manner previously described. The bounds evaluation unit 26 then retrieves a first bounds model 100 and a second bounds model 102 corresponding respectively to the currently-selected hypothesized character identifiers associated with the first and second character structures 70, and generates a bounds model pair 104 in step 924, in the manner described above. Next, the bounds evaluation unit 26 scales the bounds measurement pair 94 relative to the bounds model pair 104, and generates a set of error values E1 through E8 in step 926, in the manner described above. Following step 926, the bounds evaluation unit 26 generates and stores a pairwise cost value corresponding to the currently-selected hypothesized character identifiers in step 928, in the manner previously described.

After step 928, the bounds evaluation unit 26 determines in step 930 whether a next hypothesized character identifier is stored in the second character structure's character identifier list. If so, the preferred method returns to step 922 to select a next hypothesized character identifier stored in the second character structure's character identifier list. If a next hypothesized character identifier is not stored in the second character structure's character identifier list, the bounds evaluation unit 26 next determines whether a next hypothesized character identifier is stored in the character identifier list within the first character structure 70 in step 932. If so, the preferred method returns to step 920 to select a next hypothesized character identifier stored in the first character structure's character identifier list. Once each hypothesized character identifier in the first character structure's character identifier list has been considered, the bounds evaluation unit 26 changes the status of the second character structure 70 to that of a first character structure 70 in step 934. Following step 934, the preferred method returns to step 904 to continue operations for the currently-selected word structure 60.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A method for word recognition using size and placement models comprising the steps of:

generating a first bounds measurement from a first character pattern within a word;

generating a second bounds measurement from a second character pattern within the word, the first bounds measurement and the second bounds measurement forming a bounds measurement pair;

selecting a hypothesized character identifier associated with the first character pattern;

selecting a hypothesized character identifier associated with the second character pattern;

generating a bounds model pair corresponding to the hypothesized character identifier associated with the first character pattern and the hypothesized character identifier associated with the second character pattern; and generating a pairwise cost value indicating a size and a placement difference between the bounds measurement pair and the bounds model pair, the pairwise cost value being substantially independent of a size or a position of any additional character pattern within the word.

2. A method for word recognition using size and placement models comprising the steps of:

selecting a hypothesized character identifier associated with a first character pattern within a word;

selecting a hypothesized character identifier associated with a second character pattern within the word;

generating a bounds model pair corresponding to the hypothesized character identifier associated with the first character pattern and the hypothesized character identifier associated with the second character pattern;

generating a first bounds measurement from the first character pattern;

generating a second bounds measurement from the second character pattern, the first bounds measurement and the second bounds measurement forming a bounds measurement pair; and generating a pairwise similarity measure indicating a difference in size and placement between the bounds measurement pair and the bounds model pair, the pairwise similarity measure being substantially independent of a size or a position of any character pattern within the word other than the first and second character patterns.

3. The method of claim 2, wherein the step of generating a pairwise similarity measure comprises the step of scaling the bounds measurement pair relative to the bounds model pair.

4. The method of claim 2, wherein the step of generating the bounds model pair comprises the steps of:

retrieving a first bounds model defining an expected character pattern size and position corresponding to the hypothesized character identifier associated with the first character pattern; and retrieving a second bounds model defining an expected character pattern size corresponding to the hypothesized character identifier associated with the second character pattern.

5. The method of claim 4, further comprising the step of positioning the first and second bounds models according to a spacing value.

6. The method of claim 4, wherein the step of generating a pairwise similarity measure comprises the step of generating a set of error values indicating a size and a placement difference between the first bounds model and the first bounds measurement, and a size and a placement difference between the second bounds model and the second bounds measurement.

7. The method of claim 6, wherein the step of generating a pairwise similarity measure further comprises the step of multiplying the set of error values by an error covariance matrix.

8. A means for word recognition using size and placement models comprising:

means for selecting a hypothesized character identifier associated with a first character pattern within a word;

means for selecting a hypothesized character identifier associated with a second character pattern within the word;

means for generating a bounds model pair corresponding to the hypothesized character identifier associated with the first character pattern and the hypothesized character identifier associated with the second character pattern;

means for generating a first bounds measurement from a first character pattern within a word;

means for generating a second bounds measurement from a second character pattern within the word, the first bounds measurement and the second bounds measurement forming a bounds measurement pair; and means for generating a pairwise similarity measure indicating a difference in size and placement between the bounds measurement pair and the bounds model pair, the pairwise similarity measure being substantially independent of a size or a position of any character pattern within the word other than the first and second character patterns.

9. The means for word recognition using size and placement models of claim 8, wherein the means for generating a pairwise similarity measure comprises a means for scaling the bounds measurement pair relative to the bounds model pair.

10. The means for word recognition using size and placement models of claim 8, wherein the means for generating a bounds model pair comprises:

means for retrieving a first bounds model defining an expected character pattern size and position corresponding to the hypothesized character identifier associated with the first character pattern; and means for retrieving a second bounds model defining an expected character pattern size corresponding to the hypothesized character identifier associated with the second character pattern.

11. The means for word recognition using size and placement models of claim 10, wherein the means for generating a bounds model pair further comprises a means for positioning the first and second bounds models according to a spacing value.

12. The means for word recognition using size and placement models of claim 10, wherein the means for generating a pairwise similarity measure comprises a means for generating a set of error values indicating a size and a placement difference between the first bounds model and the first bounds measurement, and a size and a placement difference between the second bounds model and the second bounds measurement.

13. The means for word recognition using size and placement models of claim 12, wherein the means for generating a pairwise similarity measure further comprises a means for multiplying the set of error values by an error covariance matrix.

14. A system for word recognition using size and placement models comprising:

a bounds evaluation unit having an output for comparing a bounds measurement pair with a bounds model pair and for generating a corresponding comparison result independent of a word baseline estimation, the bounds measurement pair characterizing a relative size and position of a pair of adjacent handwritten characters, the bounds model pair characterizing an expected relative size and position of a pair of hypothesized characters;

a word recognition unit having an input, for generating a word recognition result using a comparison result generated by the bounds evaluation unit, the input of the word recognition unit coupled to the output of the bounds evaluation unit, and a character recognition unit having an output, for generating a set of hypothesized character identifiers corresponding to a character pattern, the output of the character recognition unit coupled to the input of the word recognition unit.

* * * * *